United States Patent
Sabat

(10) Patent No.: US 12,238,055 B2
(45) Date of Patent: Feb. 25, 2025

(54) EMAIL REVIEW SYSTEM

(71) Applicant: Yahoo Assets LLC, New York, NY (US)

(72) Inventor: Jeffry B Sabat, Fairfax, VA (US)

(73) Assignee: Yahoo Assets LLC, New York, NY (US)

( * ) Notice: Subject to any disclaimer, the term of this patent is extended or adjusted under 35 U.S.C. 154(b) by 0 days.

(21) Appl. No.: 18/104,814

(22) Filed: Feb. 2, 2023

(65) Prior Publication Data
US 2024/0267350 A1     Aug. 8, 2024

(51) Int. Cl.
*H04L 51/212*     (2022.01)

(52) U.S. Cl.
CPC .................... *H04L 51/212* (2022.05)

(58) Field of Classification Search
CPC ........ H04L 51/00; H04L 51/212; H04L 51/04
See application file for complete search history.

(56) References Cited

U.S. PATENT DOCUMENTS

| | | | | |
|---|---|---|---|---|
| 8,086,960 B1* | 12/2011 | Gopalakrishna | ...... | G06F 16/986 715/266 |
| 9,971,752 B2* | 5/2018 | Vagell | ................ | G06F 40/169 |
| 10,657,319 B1* | 5/2020 | Vagell | ................ | G06F 40/169 |
| 2005/0050145 A1* | 3/2005 | Lowe | ................ | H04L 51/214 709/206 |
| 2005/0144245 A1* | 6/2005 | Lowe | ................ | H04L 9/40 709/206 |
| 2007/0038717 A1* | 2/2007 | Burkholder | ........... | G06F 16/958 707/E17.116 |
| 2008/0140784 A1* | 6/2008 | O'Sullivan | .......... | G06Q 10/107 709/206 |
| 2009/0216843 A1* | 8/2009 | Willner | ................ | H04L 51/42 709/206 |
| 2010/0036917 A1* | 2/2010 | McCaffrey | ........... | G06Q 10/107 709/206 |
| 2012/0278401 A1* | 11/2012 | Meisels | ................ | H04L 51/234 709/206 |
| 2013/0219296 A1* | 8/2013 | Thazhmon | ........... | G06Q 10/107 715/752 |
| 2013/0326330 A1* | 12/2013 | Harris | ................ | G06F 40/197 715/234 |
| 2013/0342635 A1* | 12/2013 | Yurchenko | .......... | H04L 12/1818 348/E7.083 |

(Continued)

*Primary Examiner* — Joshua Joo
(74) *Attorney, Agent, or Firm* — Cooper Legal Group LLC

(57) ABSTRACT

One or more computing devices, systems, and/or methods are provided. In an example, a review initiation request may be received from a first email account. The review initiation request may indicate proposed email content and/or a reviewer of the proposed email content. An email may be generated based upon the review initiation request. The email may include the proposed email content and/or an email review interface including a feedback entry field and/or an approval selectable input. The email may be transmitted to a reviewer email account of the reviewer. A review response may be received, via the email review interface, from the reviewer email account. The review response may indicate (i) feedback, indicating one or more suggestions associated with the proposed email content, submitted via the feedback entry field, and/or (ii) an approval indicator, indicating approval of the proposed email content, submitted via the approval selectable input.

20 Claims, 18 Drawing Sheets

(56) References Cited

U.S. PATENT DOCUMENTS

| | | | |
|---|---|---|---|
| 2014/0149857 A1* | 5/2014 | Vagell | G06F 40/169 |
| | | | 715/255 |
| 2015/0113080 A1* | 4/2015 | Faulk | H04L 51/212 |
| | | | 709/206 |
| 2015/0341303 A1* | 11/2015 | Lu | H04L 51/224 |
| | | | 709/206 |
| 2016/0246772 A1* | 8/2016 | Hoover | G06F 40/253 |
| 2019/0109806 A1* | 4/2019 | Farrell | H04L 51/212 |
| 2019/0361964 A1* | 11/2019 | Vagell | G06F 16/176 |
| 2020/0226323 A1* | 7/2020 | Ganta | G06F 40/186 |
| 2020/0293604 A1* | 9/2020 | Nelson | G06F 40/169 |
| 2021/0203771 A1* | 7/2021 | Innocenti | H04L 51/52 |
| 2023/0171220 A1* | 6/2023 | Khosrowshahi | H04L 51/52 |
| | | | 715/752 |

* cited by examiner

EMAIL REVIEW SYSTEM

BACKGROUND

Many services, such as email services, may allow users to create email accounts for sending and receiving emails. For example, a user may use his or her email account to socialize with contacts, plan events, etc. A business may send emails to subscribers and/or prospective customers as part of at least one of a promotion, a newsletter, etc.

SUMMARY

In accordance with the present disclosure, one or more computing devices and/or methods are provided. In an example, a review initiation request may be received from a first email account. The review initiation request may be indicative of proposed email content and/or a reviewer of the proposed email content. An email may be generated based upon the review initiation request. The email may comprise the proposed email content and/or an email review interface comprising a feedback entry field and/or an approval selectable input. The email may be transmitted to a reviewer email account of the reviewer. A review response may be received, via the email review interface, from the reviewer email account. The review response may indicate (i) feedback, indicating one or more suggestions associated with the proposed email content, submitted via the feedback entry field, and/or (ii) an approval indicator, indicating approval of the proposed email content, submitted via the approval selectable input.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
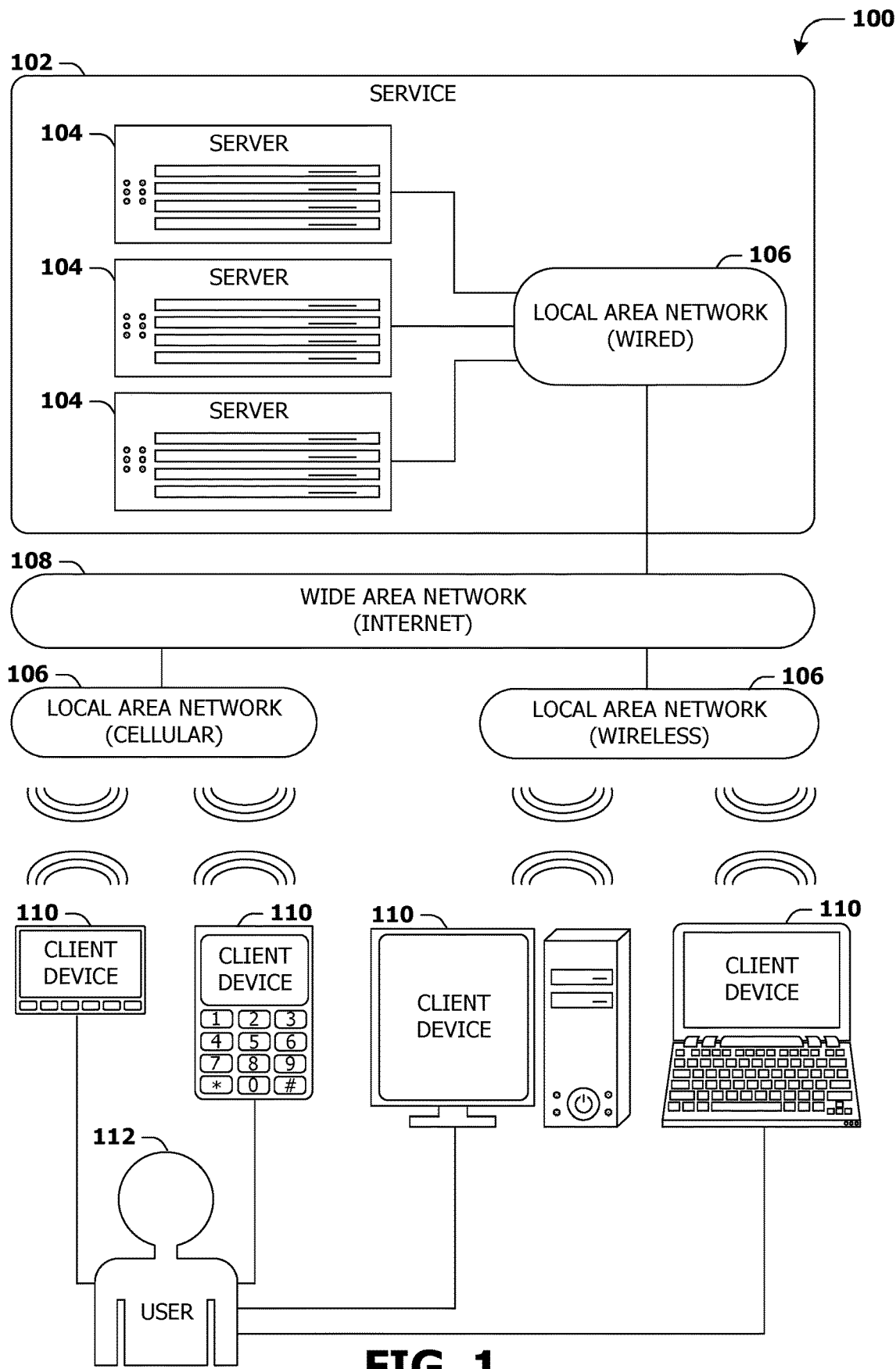
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
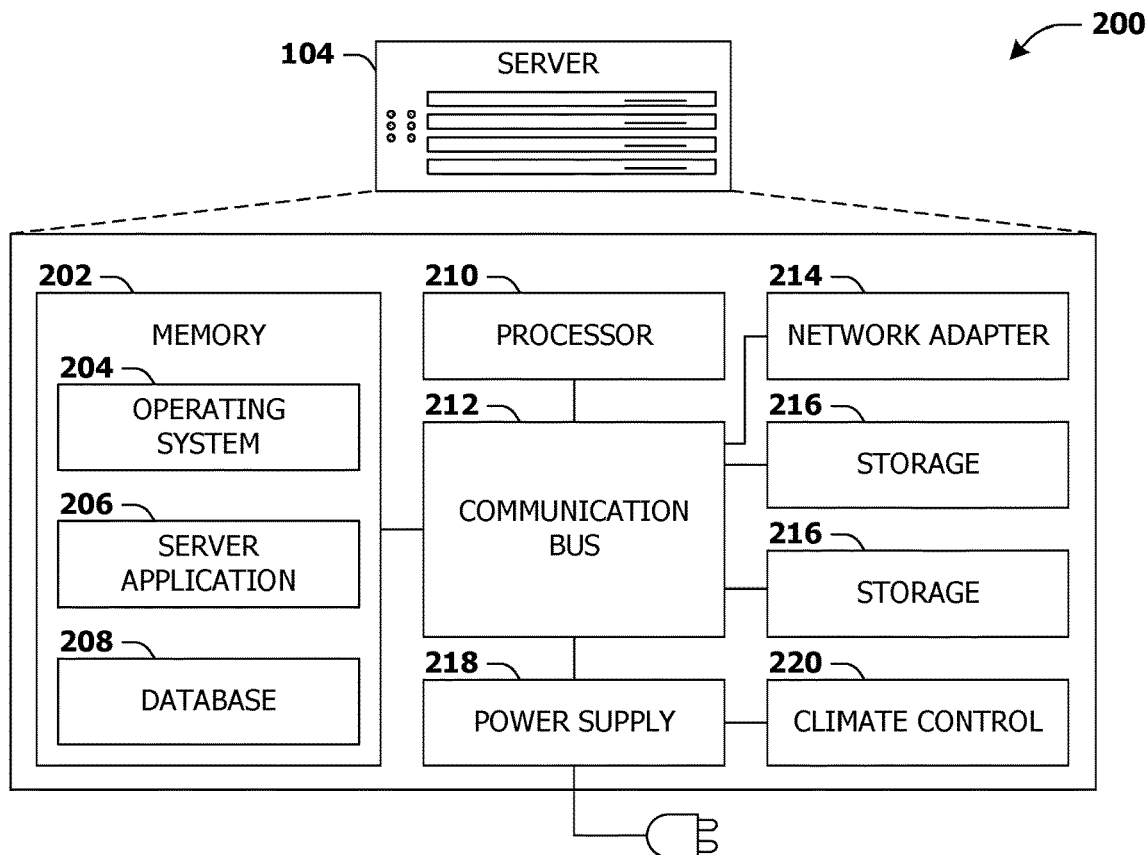
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow.

Many such servers 104 may be configured and/or adapted to utilize at least a portion of the techniques presented herein.

1.3. Client Device Configuration

Figure 3:
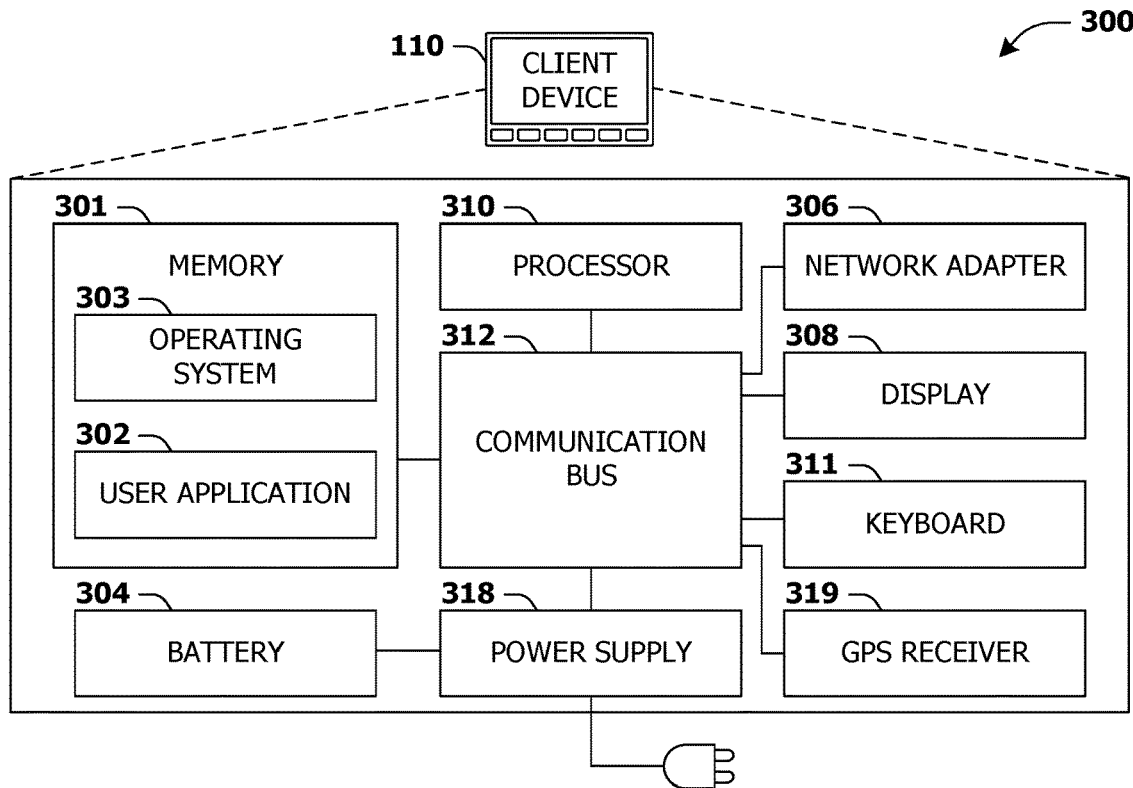
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for facilitating email review are provided. Email is often leveraged for important and/or sensitive interactions with entities such as employers, doctors, legal counsel, government agencies, etc. Some emails can require careful thought and crafting to accurately and/or appropriately get a point across or elicit a desired response. Accordingly, in many cases, it is beneficial to have one or more reviewers review an email before the email is sent. For example, an email drafter may lack experience with drafting accurate, well-formed and/or well-written email messages. Alternatively and/or additionally, the email drafter may be a new employee at a company (and/or may be tasked with communicating with a new client) and may be unaccustomed with email communication standards in the new environment. Other examples in which it would be beneficial for an email to be reviewed and/or approved before the email is sent include (i) executives looking for feedback and/or additions to a message for employees, (ii) hospital administrators looking for feedback from their legal department on third-party contracts, (iii) job seekers looking for feedback on cover letters, (iv) parents looking for feedback on a letter to a school official and/or a teacher, (v) students looking for feedback on scholarship thank you letters, etc.

Thus, in accordance with one or more of the techniques herein, an email review system is provided for facilitating email review. The email review system may provide an interface for an email drafter to (i) submit proposed email content and/or review instructions, (ii) designate one or more reviewers to review the proposed email content (in light of the review instructions, for example), and/or (iii) indicate one or more intended recipients of a reviewed (e.g., approved) email. The email review system may use the information received from the email drafter to facilitate an email review process. For example, the email review system may transmit review request emails, with the proposed email content, to the one or more reviewers. The one or more reviewers may use the review request emails to (i) review the proposed email content, and (ii) indicate approval and/or provide feedback associated with the proposed email content.

In some examples, a review request email sent to a reviewer may comprise dynamic email content that enables the reviewer to submit a review response conveniently and/or without requiring use of an interface outside the review request email. For example, the review request email with the dynamic email content may enable the reviewer to (i) view a most recent version of the proposed email content (e.g., the review request email may dynamically update the proposed email content to display the most recent version of the proposed email content), (ii) submit feedback (e.g., submit one or more suggestions to the email drafter) using a feedback entry field, and/or (iii) indicate approval using an approval selectable input (e.g., the feedback entry field and/or the approval selectable input may be part of an actionable form embedded in the review request email).

When review responses (indicating approval and/or feedback) are received from the one or more reviewers, the email review system may determine whether an approval condition is met and/or whether the review responses provide feedback to the proposed email content (e.g., suggestions to modify the proposed email content).

If the approval condition is met (e.g., in the case of unanimous approval among the review responses received from the designated reviewers) and an automatic delivery-upon-approval function is enabled for the email review process, the email review system may automatically transmit an email with the (approved) proposed email content to the one or more intended recipients. Alternatively and/or additionally, if the automatic delivery-upon-approval function is disabled, the email review system may transmit an approval email to the email drafter, which may comprise an email delivery selectable input associated with transmission of the email (with the approved email content) to the one or more intended recipients.

If the review responses comprise feedback to the proposed email content, the email review system may notify the email drafter of the feedback and may enable the email drafter to submit a revised version of the proposed email content (for further review by the one or more reviewers, for example). For example, the email review system may send a feedback email, to the email drafter, comprising dynamic email content that enables the email drafter to view the feedback and revise the proposed email content (in light of the feedback) conveniently and/or without requiring use of an interface outside the feedback email. The email review system may facilitate one or more subsequent review cycles (in an iterative manner) in which the email review system provides the one or more reviewers with review request emails with the revised version of the proposed email content (and/or subsequently revised versions of the proposed email content). The email review process may be completed when the email review system determines that the approval condition is met and/or the email review system transmits an email (with an approved version of the proposed email content, for example) to the one or more intended recipients.

Figure 4:
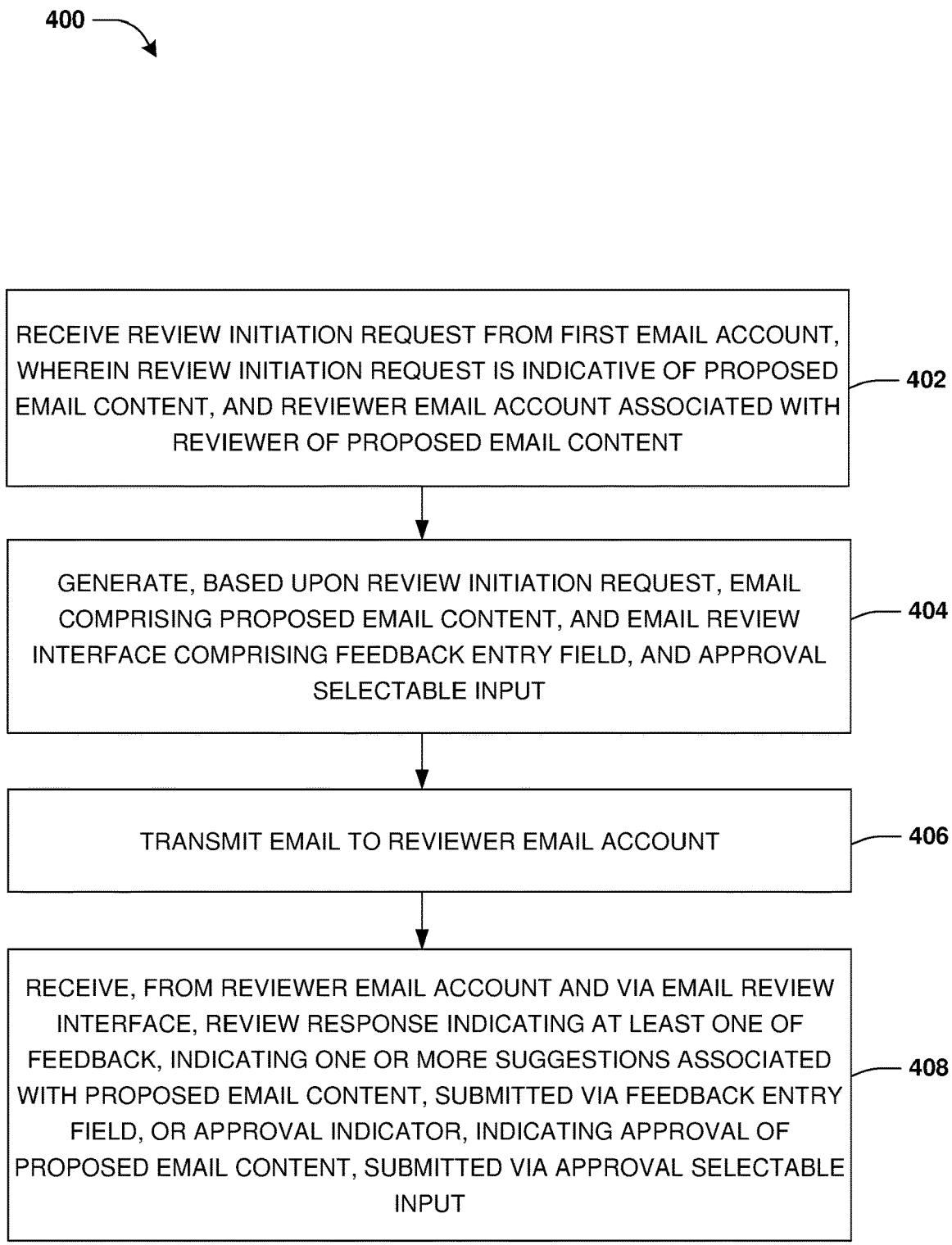
FIG. 4 is a flow chart illustrating an example method for facilitating email review associated with emails.

An embodiment of facilitating email review is illustrated by an example method 400 of FIG. 4, and is further described in conjunction with system 501 of FIGS. 5A-5M.

At 402, an email review system may receive a review initiation request from a first email account. The first email account may be associated with a first user. The review initiation request may correspond to a request (e.g., an application programming interface (API) request sent to a server of the email review system) to initiate an email review process in which one or more first reviewers review proposed email content and (i) provide feedback associated with the proposed email content and/or (ii) indicate approval of the proposed email content. For example, the review initiation request may be received from a first client device associated with the first email account and/or the first user. The first client device may comprise at least one of a laptop, a desktop computer, a phone, a computer, a wearable device, a smart device, a television, any other type of computing device, hardware, etc. The review initiation request may be received via a first email interface associated with the first email account. The review initiation request may be received when at least one of a browser (e.g., a web browser), an application (e.g., at least one of a mobile application, a web application, an email application, etc.), etc. of the first client device is logged into the first email account and/or authorized to access emails and/or email-related functions associated with the first email account. In some examples, the review initiation request may be transmitted by at least one of the browser, the application, etc. of the first client device.

Figure 5A:
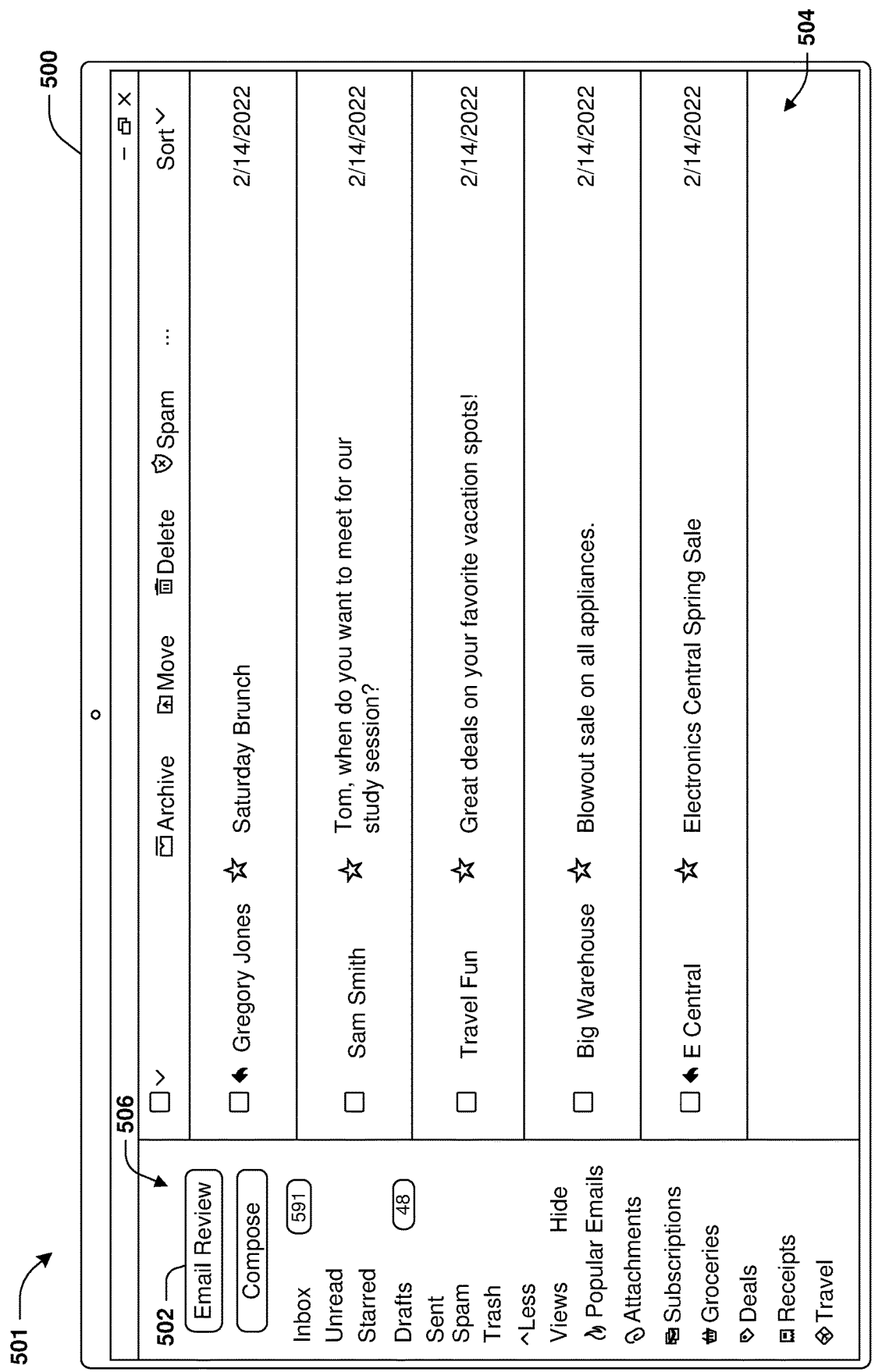
FIG. 5A is a component block diagram illustrating an example system for facilitating email review, where a first email interface is displayed via a first client device.

FIG. 5A illustrates the first email interface being displayed via the first client device (shown with reference number 500). In an example, the first email interface may display a list of email items 504 (e.g., emails corresponding to the email items may be accessed via the list of email items 504) and/or an options menu 506 comprising selectable inputs for selecting at least one of email functions (e.g., compose email, request email review, etc.), email categories (e.g., inbox, popular emails, trash, etc.), etc. The first email interface may display an email review selectable input 502 (in the options menu 506, for example). In response to a selection of the email review selectable input 502, the first email interface may display an email review initiation interface 510.

Figure 5B:
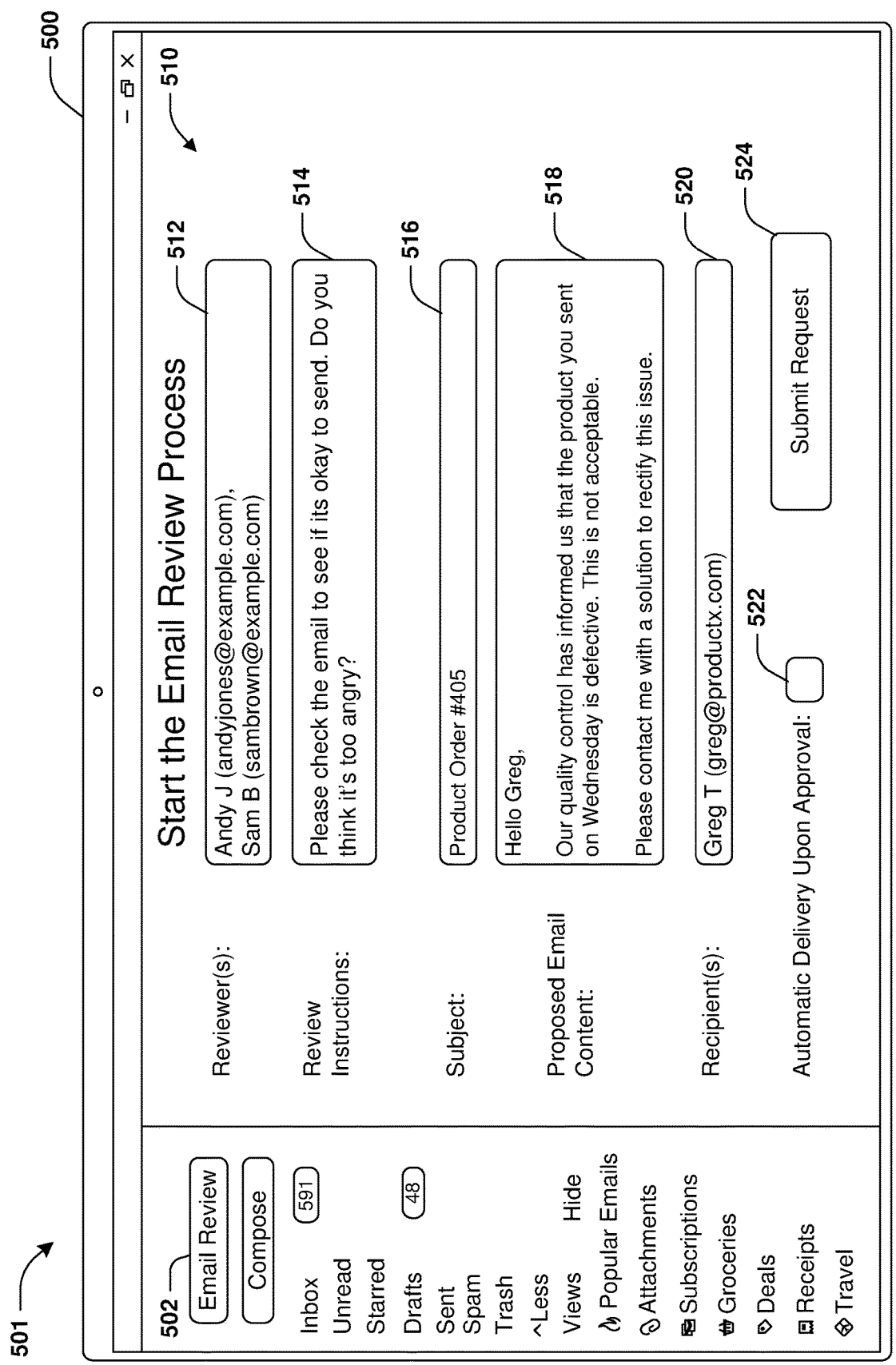
FIG. 5B is a component block diagram illustrating an example system for facilitating email review, where a first email interface displays an email review initiation interface.

FIG. 5B illustrates the first email interface displaying the email review initiation interface (shown with reference number 510). The email review initiation interface 510 may comprise an actionable form (e.g., an interactive form comprising selectable inputs and/or text fields) for submitting information associated with the review initiation request.

The email review initiation interface 510 may comprise a reviewer entry field 512 (e.g., a text box) for designating the one or more first reviewers. For example, the first user may input identification information (e.g., email addresses, contact information, etc.) of the one or more first reviewers via the reviewer entry field 512. Alternatively and/or additionally, the email review system may suggest one or more suggested reviewers, and one or more reviewers (of the one or more first reviewers) may be selected from the one or more suggested reviewers. For example, the email review initiation interface 510 may display a list of suggested reviewers indicating the one or more suggested reviewers, and the first user may select, from the list, one or more reviewers for inclusion in the one or more first reviewers. In an example, the one or more suggested reviewers may be selected (by the email review system for suggestion to the first user) based upon historical review initiation requests associated with the first email account (e.g., one or more suggested reviewers may be included in the list of suggested reviewers based upon a determination that the first user designated the one or more suggested reviewers in one or more historical review initiation requests sent by the first email account). Alternatively and/or additionally, the email review system may automatically select the one or more first reviewers (e.g., the one or more first reviewers may be automatically designated as reviewers of the proposed email content). Alternatively and/or additionally, the email review system may randomly select the one or more first reviewers (e.g., the one or more first reviewers may be randomly selected from a list of contacts of the first email account).

In some examples, the email review system may select the one or more suggested reviewers and/or the one or more first reviewers based upon (i) one or more profiles of the one or more first reviewers and/or the first user, (ii) one or more positions, roles and/or skills of the one or more first reviewers and/or the first user and/or (iii) one or more topics associated with the proposed email content. For example, the email review system may determine an expected milestone in the life, career and/or education of the first user (e.g., based upon the profile of the first user, an age of the first user and/or based upon emails sent to and from the first user), and may select the one or more suggested reviewers and/or the one or more first reviewers based upon the expected milestone (e.g., such that some reviewers may be selected for a milestone related to applying to college, while other reviewers may be selected for a milestone related to finding a job).

The email review initiation interface 510 may comprise a review instructions entry field 514 (e.g., a text box). For example, the first user may input review instructions via the review instructions entry field 514. The reviewer instructions may comprise at least one of notes, details, instructions, etc. that (i) provide information that may assist the one or more first reviewers in understanding a purpose of the email review process, (ii) indicate a part and/or aspect of the proposed email content that the one or more first reviewers should place an emphasis on reviewing, and/or (iii) indicate a part and/or aspect of the proposed email content that the one or more first reviewers should verify.

The email review initiation interface 510 may comprise a subject entry field 516 (e.g., a text box). For example, the first user may input an email subject via the subject entry field 516. In some examples, in response to completion of the email review process, the email subject input via the subject entry field 516 may be used as a subject of a final and/or approved email delivered to one or more intended recipients.

The email review initiation interface 510 may comprise a proposed email content entry field 518 (e.g., a text box). For example, the first user may input the proposed email content (to be reviewed by the one or more first reviewers) via the proposed email content entry field 518. In an example, the proposed email content may comprise text (e.g., unformatted text and/or formatted text in one or more fonts, styles, paragraph formatting, etc.), one or more images (e.g., the one or more images may be included as part of a message and/or may be included as an attachment), one or more videos (e.g., the one or more videos may be included as part of a message and/or may be included as an attachment), one or more links, one or more files (e.g., the one or more files may be included as an attachment), etc. In an example, the email review initiation interface 510 may comprise one or more selectable inputs (not shown) for at least one of formatting text (e.g., selectable inputs associated with one or more fonts, highlighting, styles, paragraph formats, etc.), attaching files, inserting hyperlinks, etc.

The email review initiation interface 510 may comprise a recipient entry field 520 (e.g., a text box) for designating the one or more intended recipients of the proposed email content. For example, the first user may input identification information (e.g., email addresses, contact information, etc.) of the one or more intended recipients via the recipient entry field 520. Alternatively and/or additionally, the email review system may suggest one or more suggested recipients, and the one or more intended recipients may be selected from the one or more suggested recipients. For example, the email review initiation interface 510 may display a list of suggested recipients indicating the one or more suggested recipients, and the first user may select the one or more intended recipients from the list. In an example, the one or more suggested recipients may be selected (by the email review system for suggestion to the first user) based upon historical emails sent by the first email account (e.g., one or more suggested recipients may be included in the list of suggested recipients based upon a determination that the first user sent one or more emails to the one or more suggested recipients).

The email review initiation interface 510 may comprise a function enablement selectable input 522 (e.g., a checkbox button) for enabling or disabling an automatic delivery-upon-approval function. In some examples, if the automatic delivery-upon-approval function is enabled (e.g., if the function enablement selectable input 522 is selected), an email comprising an approved version of the proposed email content may be automatically transmitted to the one or more intended recipients in response to an approval condition being met. Alternatively and/or additionally, if the automatic delivery-upon-approval function is disabled (e.g., if the function enablement selectable input 522 is not selected), an email comprising an approved version of the proposed email content may not be automatically transmitted to the one or more intended recipients in response to the approval condition being met (e.g., the email with the approved version of the proposed email content may be sent manually in response to a signal from the first email account).

Figure 5C:
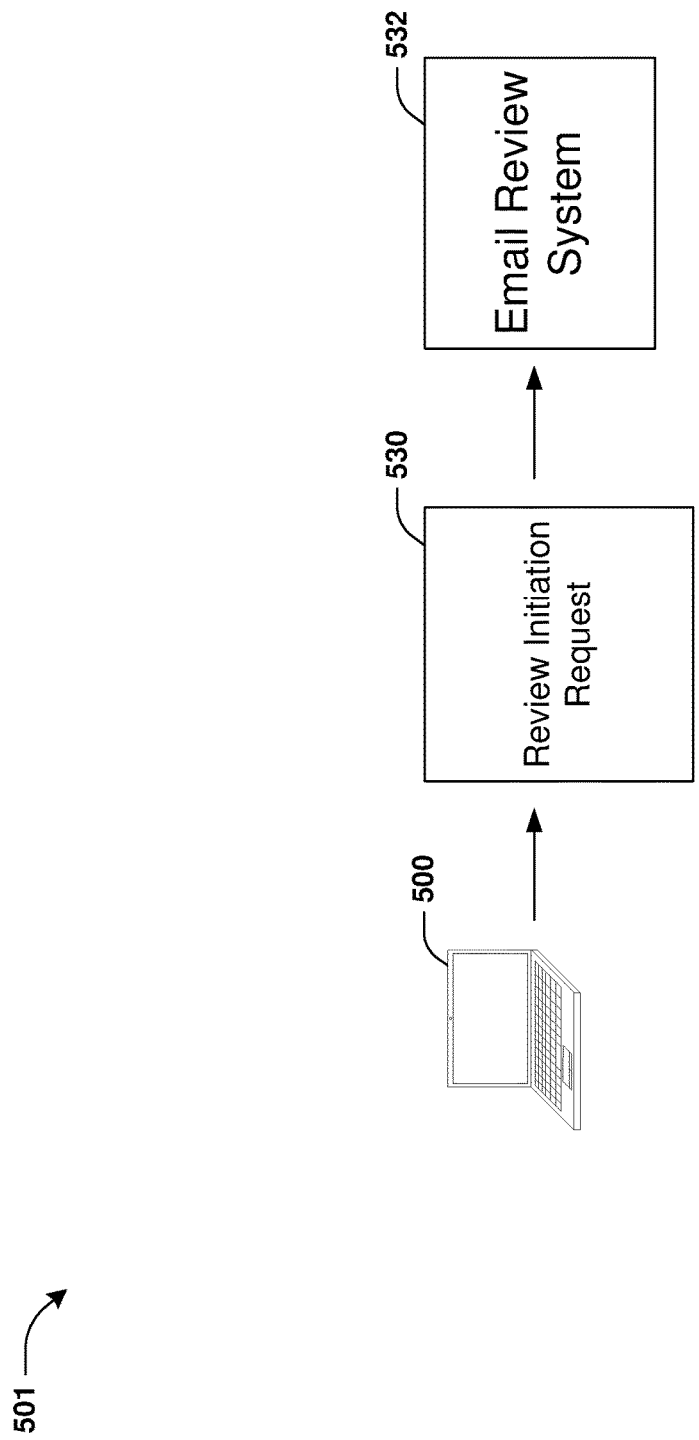
FIG. 5C is a component block diagram illustrating an example system for facilitating email review, where a first client device transmits a review initiation request to an email review system.

The email review initiation interface 510 may comprise a submit request selectable input 524 (e.g., a button) associated with submitting information entered via the email review initiation interface 510. In response to a selection of the submit request selectable input 524, the review initiation request, comprising the information entered via the email review initiation interface 510, may be transmitted to the email review system. FIG. 5C illustrates the first client device 500 transmitting the review initiation request (shown with reference number 530) to the email review system (shown with reference number 532). The review initiation request 530 may be indicative of the proposed email content, the one or more first reviewers (e.g., the review initiation request 530 may be indicative of one or more email addresses of one or more reviewer email accounts of the one or more first reviewers), the review instructions, the email subject, the proposed email content, the one or more intended recipients, and/or an indication of enablement or disablement of the automatic delivery-upon-approval function.

In some examples, in response to the review initiation request 530, the email review system 532 may store an email review process record in an email review data store (e.g., an email review database for managing and/or keeping track of email review processes). The email review process record may be indicative of the proposed email content, the one or more first reviewers, the review instructions, the email subject, the proposed email content, the one or more intended recipients, and/or whether the automatic delivery-upon-approval function is enabled or disabled. Alternatively and/or additionally, the email review system 532 may store an email review process record identifier, in the email review process record, that uniquely identifies the email review process record among a plurality of email review process records stored in the email review data store, for example. Alternatively and/or additionally, the email review system 532 may store (in the email review data store, for example) a review cycle identifier, in the email review process record, that indicates a current review cycle of the email review process. The review cycle identifier may start with an initial value. For example, the current review cycle of the email review process may be an initial review cycle when the review cycle identifier is the initial value.

Figure 5D:
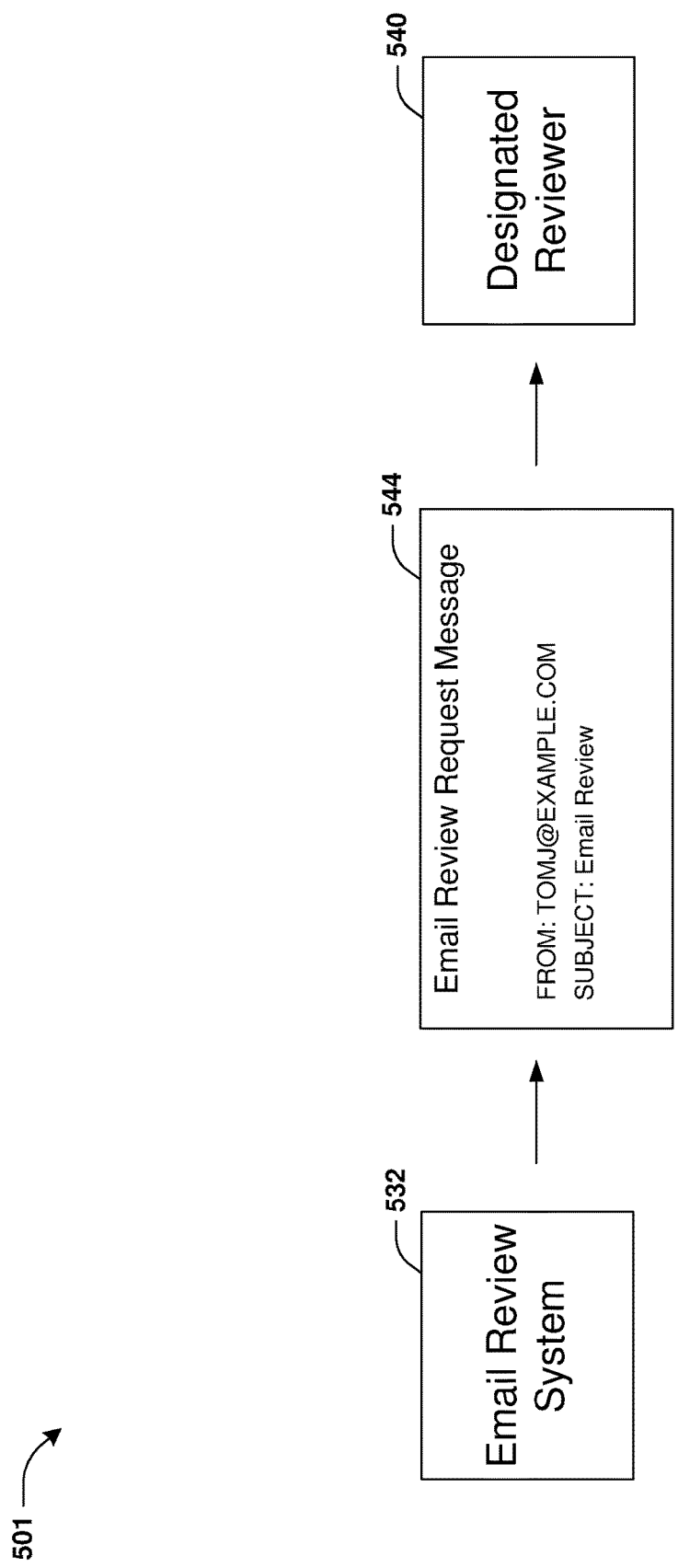
FIG. 5D is a component block diagram illustrating an example system for facilitating email review, where an email review system transmits a first review request email to a first reviewer email account.

At 404 of FIG. 4, the email review system 532 may generate a first review request email based upon the review initiation request 530. The first review request email may comprise the proposed email content and a first email review interface comprising a feedback entry field and/or an approval selectable input. For example, the proposed email content and the first email review interface may be included in an email body of the first review request email. At 406, the email review system 532 may transmit the first review request email to a first reviewer email account of a first reviewer indicated by the review initiation request 530. For example, the first review request email may be addressed to an email address of the first reviewer email account. FIG. 5D illustrates the email review system 532 transmitting the first review request email (shown with reference number 544) to the first reviewer email account (shown with reference number 540) of the first reviewer. In an example, the first review request email 544 may comprise an email subject "Email Review". The first review request email 544 may indicate that the first review request email 544 is sent by the first email account 566. For example, the email review system 532 may populate a "from" field (and/or a "sender" field) in an email header of the first review request email 544 with an indication of an email address (e.g., "TOMJ@EXAMPLE.COM" shown in FIG. 5D) of the first email account 566 of the first user.

Figure 5E:
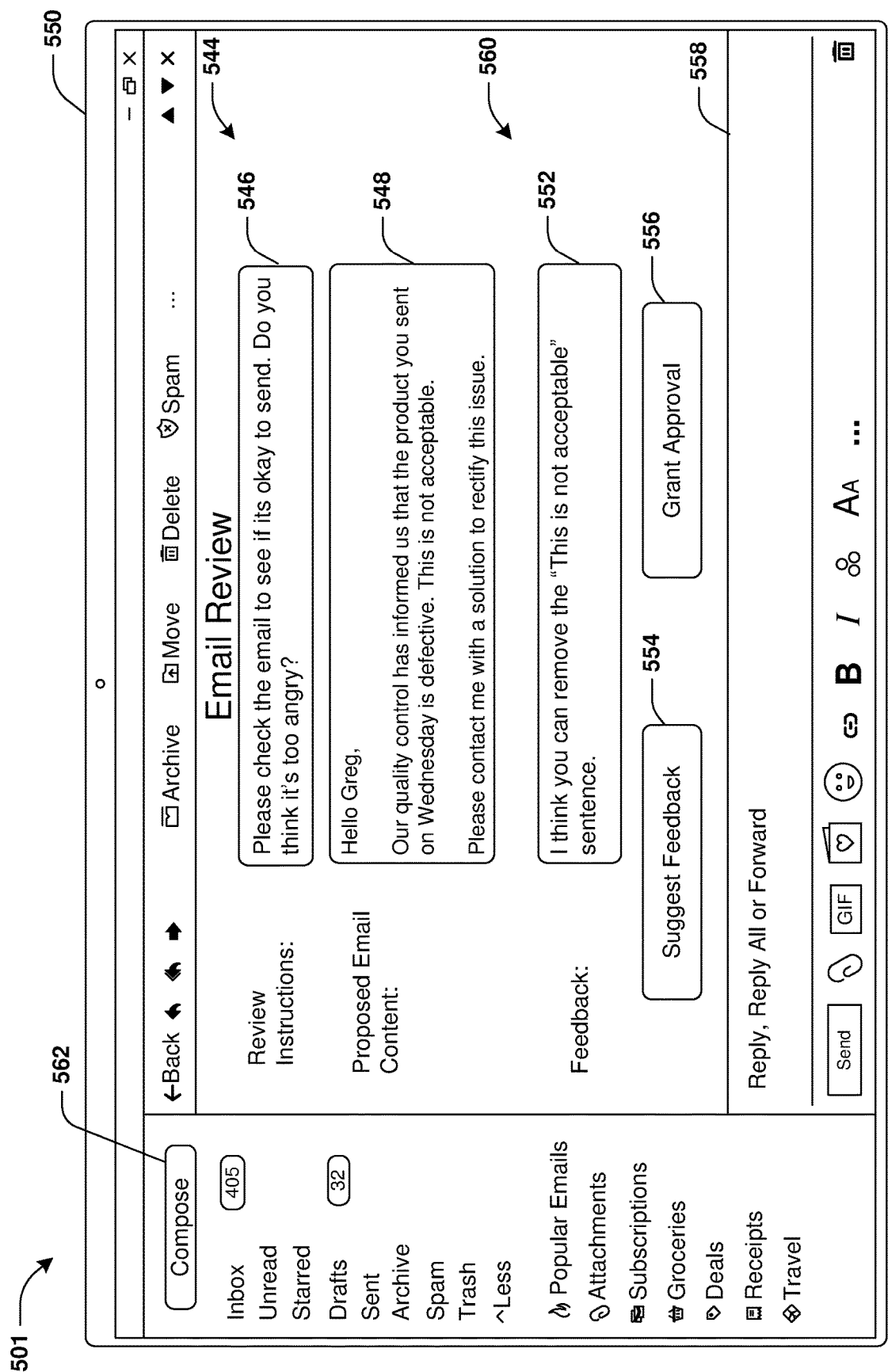
FIG. 5E is a component block diagram illustrating an example system for facilitating email review, where a second email interface displays a first review request email.

In some examples, the first reviewer may access the first review request email 544 via a second email interface on a second client device 550 (shown in FIG. 5E) associated with the first reviewer. FIG. 5E illustrates the second email interface displaying the first review request email 544. The first review request email 544 may be displayed in response to a selection of an email item corresponding to the first review request email 544. The first review request email 544 may comprise the review instructions (shown with reference number 546) and/or the proposed email content (shown with reference number 548). The review instructions 546 may be displayed in a text box (e.g., a non-editable text box). Alternatively and/or additionally, the proposed email content 548 may be displayed in a text box (e.g., a non-editable text box).

The first email review interface (shown with reference number 560) may comprise a feedback entry field 552 (e.g., a text box) for submitting feedback associated with the proposed email content 548 (e.g., the feedback may correspond to one or more suggestions by the first reviewer regarding the proposed email content 548). The first email review interface 560 may comprise a suggest feedback selectable input 554 (e.g., a button) associated with submitting feedback entered (by the first reviewer) via the feedback entry field 552. Alternatively and/or additionally, the first email review interface 560 may comprise an approval selectable input 556 (e.g., a button) associated with indicating approval of the proposed email content 548.

In some examples, the first review request email 544 may comprise an indication (e.g., a non-editable indication) of the email review process record identifier to identify the email review process record associated with the email review process, an indication (e.g., a non-editable indication) of the review cycle identifier to identify the current review cycle (e.g., the initial review cycle) of the email review process and/or an indication (e.g., a non-editable indication) of a reviewer identifier that identifies the first reviewer. In some examples, the indications of the email review process record identifier, the review cycle identifier, and/or the reviewer identifier may be included in the first email review interface 560. The indications of the email review process record identifier, the review cycle identifier, and/or the reviewer identifier may be hidden from view (e.g., the indications of the email review process record identifier, the review cycle identifier, and/or the reviewer identifier may be in one or more hidden form fields of the first email review interface 560).

In some examples, the first review request email 544 may be a first dynamic email comprising dynamic email content. The dynamic email content may comprise the first email review interface 560, which may correspond to a dynamic and/or actionable form embedded in the first review request email 544. The dynamic email content may be included in the first review request email 544 based upon a determination that the first reviewer email account 540 is associated with a dynamic email function. The dynamic email function may correspond to functionality for displaying dynamic content. The dynamic email function (and/or the dynamic email content in the first reviewer request email 544) may be implemented using Accelerated Mobile Pages (AMP) technology (e.g., AMP4EMAIL framework) and/or other technology. The determination that the first reviewer email account 540 is associated with the dynamic email function may be based upon (i) a determination that the second email interface associated with the first reviewer email account 540 (and/or an application on which the second email interface is implemented) is configured with the dynamic email function and/or is configured to provide and/or implement the dynamic email content, and/or (ii) a determination that an email service provider of the first reviewer email account 540 provides support for the dynamic email function (e.g., the email review system 532 may identify the email service provider of the first reviewer email account 540 based upon a domain name of an email address of the first reviewer email account 540).

Including the dynamic email content (comprising the first email review interface 560) in the first review request email 544 may enable the first reviewer to submit the feedback (via the feedback entry field 552) and/or indicate approval (via the approval selectable input 556) without having to interact with an interface outside the first review request email 544. For example, the first reviewer may submit the feedback and/or indicate approval by interacting with the dynamic email content (e.g., the first email review interface 560) within the first review request email 544. For example, the first reviewer may submit the feedback and/or indicate approval without interacting with a reply-to interface 558 and/or a compose email interface (that would be displayed in response to selecting a compose selectable input 562, for example) of the second email interface. For example, the first email review interface 560 may be separate from and/or outside of the reply-to interface 558 and/or the compose email interface.

At 408 of FIG. 4, the email review system 532 may receive a first review response from the first reviewer email account 540. In some examples, the first review response may be received in response to a selection of the suggest feedback selectable input 554 and/or the approval selectable input 556. In an example, the first review response may comprise the feedback (submitted via the feedback entry field 552, for example) and/or an approval indicator (submitted via the approval selectable input 556). The first review response may comprise the feedback based upon the first reviewer submitting the feedback via the feedback entry field 552 and/or selecting the suggest feedback selectable input 554. Alternatively and/or additionally, the first review response may comprise the approval indicator (indicating approval of the proposed email content 548) based upon the first reviewer selecting the approval selectable input 556. In some examples, the first review response may comprise the email review process record identifier, the review cycle identifier and/or the reviewer identifier, which may be used by the email review system 532 to identify the proposed email content 548, the current review cycle, and/or the first reviewer (and/or the first reviewer email account 540) associated with the first review response. In some examples, the first review response may comprise a status (e.g., a status code) indicating "approved" (if the approval selectable input 556 is selected, for example) and/or "feedback" (if the first review response comprises the feedback, for example). The first review response may not be transmitted via an email (e.g., the first review response is not submitted by sending an email to the first email account of the first user). For example, the first reviewer email account 540 may not send an email (to the first email account, for example) when the first reviewer submits the feedback and/or the approval indicator in the first review response.

The email review system 532 may transmit a first set of (one or more) review request emails, comprising the first review request email 544, to the one or more reviewer email accounts of the one or more first reviewers. In an example in which the one or more first reviewers (designated to review the proposed email content 548, for example) comprise multiple reviewers, the first set of review request emails may comprise multiple review request emails transmitted to email accounts associated with the multiple reviewers. Each review request email of the first set of review request emails comprises the proposed email content 548. The first set of review request emails may comprise the first review request email 544 transmitted to the first reviewer email account 540 of the first reviewer, a second review request email transmitted to a second reviewer email account of a second reviewer of the multiple reviewers, etc.

In some examples, the first set of review request emails may comprise one or more dynamic emails (e.g., the first review request email 544 and/or one or more other review request emails) and/or one or more static emails. For each reviewer of the multiple reviewers, the email review system 532 may determine whether to send a static review request email or a dynamic review request email to an email account associated with the reviewer based upon whether the email account is associated with the dynamic email function. For example, the email review system 532 may send a dynamic email (e.g., with dynamic email content comprising an email review interface) to the email account based upon a determination that the email account is associated with the dynamic email function (e.g., based upon (i) a determination that an email interface and/or an application associated with the email account is configured with the dynamic email function and/or is configured to provide and/or implement dynamic email content, and/or (ii) a determination that an email service provider of the email account provides support for the dynamic email function). The email review system 532 may send a static email (e.g., an email without dynamic email content) to the email account based upon a determination that the email account is not associated with the dynamic email function (e.g., based upon (i) a determination that an email interface and/or an application associated with the email account is not configured with the dynamic email function and/or is not configured to provide and/or implement dynamic email content, and/or (ii) a determination that an email service provider of the email account does not provide support for the dynamic email function).

In some examples, the second review request email (transmitted to the second reviewer email account) is a static email. In an example, the second review request email (e.g., the static email) may comprise the proposed email content 548, the review instructions 546 and/or response submission instructions. The email review system 532 may receive a second review response from the second reviewer email account. In some examples, the second review response may comprise an email, such as a reply email (e.g., a reply to the second review request email). The email may be a reply email composed and/or sent by the second reviewer using a reply-to function of an email interface associated with the second reviewer email account. In some examples, the email review system 532 may analyze the email to identify feedback and/or an approval indicator in the email. For example, the email review system 532 may analyze the email to identify an approval term (e.g., "approval", "approved", "I approve this", or the like). An approval term may be interpreted, by the email review system 532, as an approval indicator (e.g., the email review system 532 may determine that the second reviewer approved the proposed email content 548 based upon identification of the approval term in the email). Alternatively and/or additionally, text different than an approval term may be interpreted as feedback from the second reviewer. The response submission instructions may provide information that may assist the second reviewer in submitting the second review response. For example, the response submission instructions may be "Please reply to this email with your feedback. If you approve of the proposed message, please include the word 'Approve' in your reply".

Alternatively and/or additionally, the second review request email (e.g., the static email) may comprise a link to an internet resource (e.g., a web page, an application, etc.) comprising at least one of the proposed email content 548 and/or the review instructions 546. For example, in response to a selection of the link, the internet resource may be displayed on a third client device associated with the second reviewer. The second reviewer may interact with an interface provided by the internet resource to submit the second review response. In some examples, the interface provided by the internet resource may comprise one, some and/or all of the features of the first email review interface 560 and/or the first review request email 544.

In some examples, the email review system 532 may update the email review process record based upon the first review response received from the first reviewer email account 540 (and/or based upon one or more other review responses received from one or more other reviewer email accounts of the one or more first reviewers). For example, the email review system 532 may store, in the email review process record, a first review response record based upon the first review response. The first review response record may be indicative of the reviewer identifier associated with the first reviewer. In an example in which the first review response comprises feedback associated with the proposed email content 548, the first review response record may comprise the feedback and/or the status (e.g., the status code) indicating "feedback". In an example in which the first review response comprises the approval indicator (indicating approval of the proposed email content 548), the first review response record may comprise the status indicating "approval".

In some examples, the email review system 532 may trigger a reminder function in response to a determination that an unresponsive reviewer of the one or more first reviewers has not provided a review response within a first threshold duration of time after transmission of a review request email for the unresponsive reviewer. For example, the email review system 532 may trigger the reminder function in response to a determination that no review response was received from the first reviewer email account 540 and the first threshold duration of time elapsed since transmission of the first review request email 544. In response to triggering the reminder function, the email review system 532 may transmit a reminder email (reminding the first reviewer to provide a review response for the proposed email content 548, for example) to the first reviewer email account 540.

In some examples, the email review system 532 may determine that the current review cycle (e.g., the initial review cycle) of the email review process is complete based upon a determination that a review cycle completion condition is met. The review cycle completion condition may be determined to be met based upon a determination that review responses associated with the proposed email content 548 are received from all reviewers of the one or more first reviewers. For example, it may be determined that the current review cycle (e.g., the initial review cycle) is complete based upon a determination that a quantity of review responses received in association with the proposed email content 548 matches a quantity of reviewers of the one or more first reviewers. Alternatively and/or additionally, the review cycle completion condition may be determined to be met based upon a determination that a second threshold duration of time elapsed after transmission of the first set of review request emails (and/or based upon a determination that review responses associated with the proposed email content 548 are received from at least a threshold proportion (e.g., 100%, 75%, or other proportion) of the one or more first reviewers). For example, it may be determined that the current review cycle (e.g., the initial review cycle) is complete based upon a determination that the second threshold duration of time elapsed (and/or based upon a determination that the quantity of review responses received in association with the proposed email content 548 corresponds to at least the threshold proportion of the one or more first reviewers) (even if the quantity of review responses received in association with the proposed email content 548 does not match the quantity of reviewers of the one or more first reviewers). The second threshold duration of time may be longer than the first threshold duration of time associated with triggering the reminder function (e.g., the second threshold duration of time being longer than the first threshold duration of time may provide an unresponsive reviewer with additional time to submit a review response after being provided with a reminder email).

In some examples, in response to determining that the current review cycle (e.g., the initial review cycle) of the email review process is complete (e.g., in response to determining that the review cycle completion condition is met), the review cycle identifier may be modified (e.g., incremented) from the initial value to a different value (e.g., initial value+1) indicative of a second review cycle of the email review process (e.g., a subsequent review cycle after the initial review cycle).

In some examples, the email review system 532 may determine a review process status of the email review process. The review process status may be determined in response to determining that the current review cycle (e.g., the initial review cycle) of the email review process is complete (e.g., in response to determining that the review cycle completion condition is met). The review process status may be determined based upon a first set of (one or more) review responses received from the one or more first reviewers (e.g., review responses received in response to the first set of review request emails). The first set of review responses may correspond to an initial round of review responses received in the initial review cycle. The review process status may indicate that approval of the proposed email content 548 is granted based upon a determination that the approval condition associated with the email review process and/or the proposed email content 548 is met. The approval condition may be determined to be met based upon a determination that (i) at least a threshold proportion (e.g., 100%, 75%, or other proportion) of the first set of review responses indicate approval of the proposed email content 548, and/or (ii) the first set of review responses do not comprise feedback associated with the proposed email content 548. Alternatively and/or additionally, the review process status may indicate that feedback associated with the proposed email content 548 is available based upon a determination that a review response of the first set of review responses comprises feedback associated with the proposed email content 548.

In some examples, one or more approved-email actions may be performed in response to the approval condition being met (and/or in response to the review process status indicating that approval of the proposed email content 548 is granted). The one or more approved-email actions are further discussed below.

In some examples, one or more available-feedback actions may be performed in response to a review response of the first set of review responses comprising feedback associated with the proposed email content 548 (and/or in response to the review process status indicating that feedback associated with the proposed email content 548 is available).

Figure 5F:
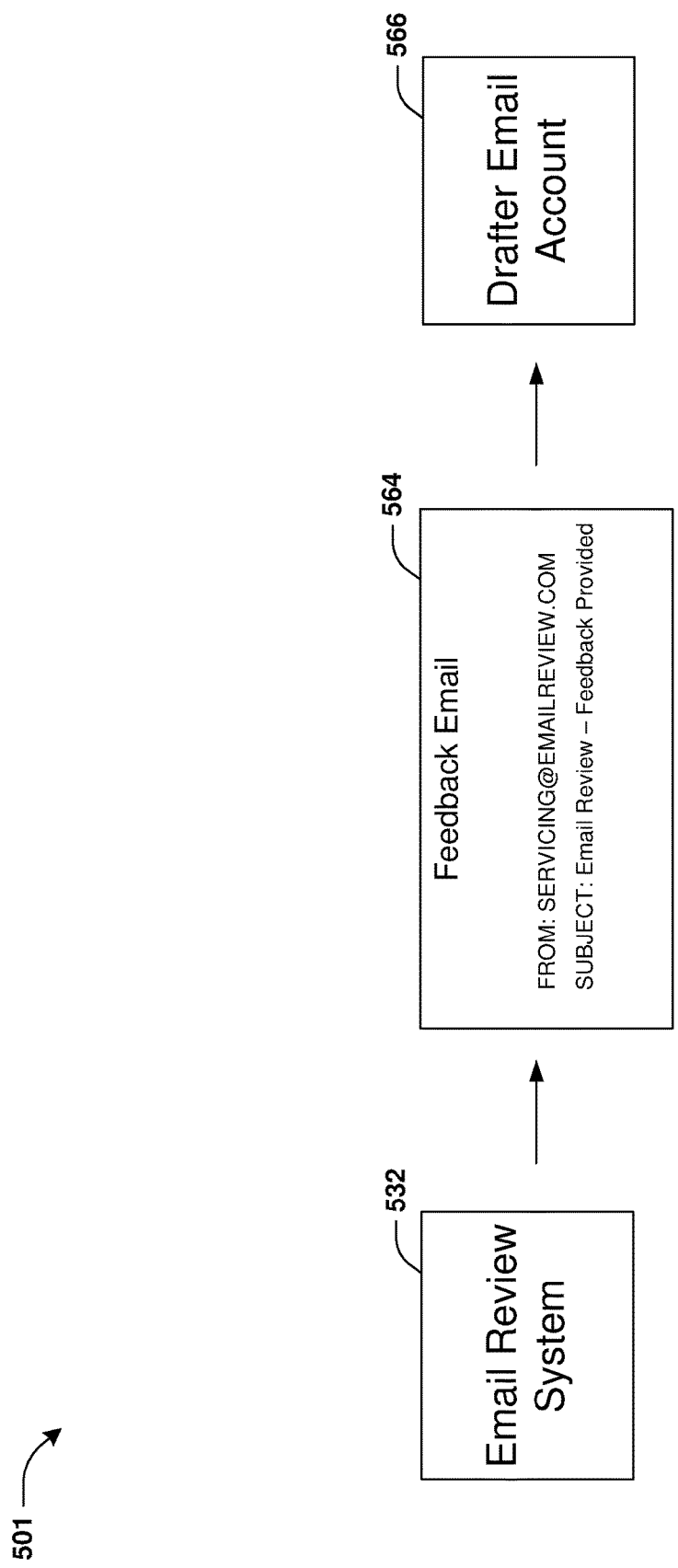
FIG. 5F is a component block diagram illustrating an example system for facilitating email review, where an email review system transmits a first feedback email to a first email account.

In some examples, the one or more available-feedback actions may comprise generating a first feedback email and transmitting the first feedback email to the first email account. FIG. 5F illustrates the email review system 532 transmitting the first feedback email (shown with reference number 564) to the first email account (shown with reference number 566). In some examples, the first user (associated with the first email account 566) may access the first feedback email 564 via the first email interface on the first client device 500. The first feedback email 564 may indicate that the first feedback email 564 is sent by a servicing account associated with the email review system 532. For example, the email review system 532 may populate a "from" field (and/or a "sender" field) in an email header of the first feedback email 564 with an indication of an email address (e.g., "SERVICING@EMAILREVIEW.COM" shown in FIG. 5F) of the servicing account. Alternatively and/or additionally, the first feedback email 564 may indicate that the first feedback email 564 is sent by an email address of a reviewer of the one or more first reviewers. For example, the email review system 532 may populate the "from" field (and/or the "sender" field) of the first feedback email 564 with an indication of an email address of the reviewer.

Figure 5G:
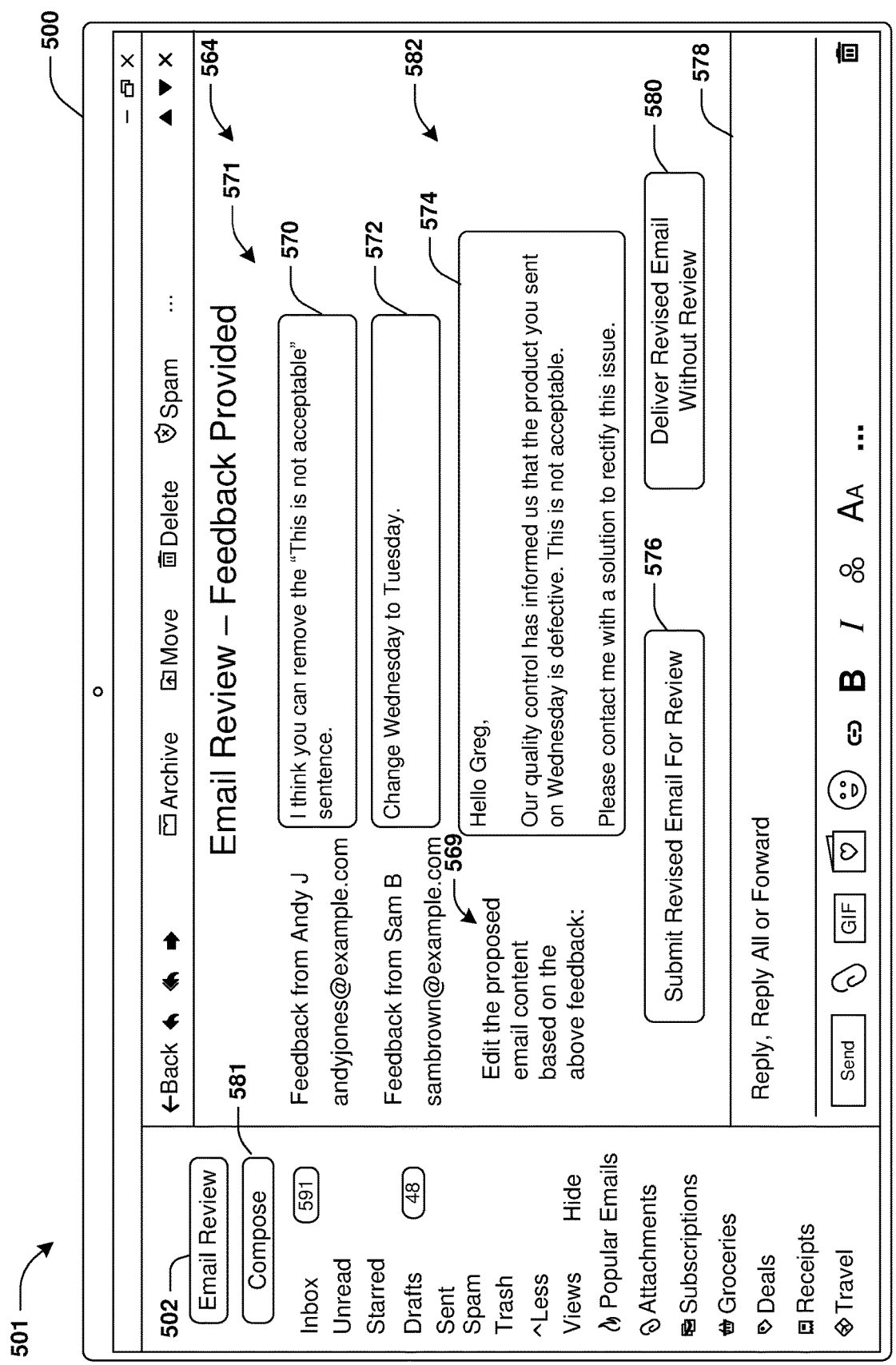
FIG. 5G is a component block diagram illustrating an example system for facilitating email review, where a first email interface displays a first feedback email.

FIG. 5G illustrates the first email interface displaying the first feedback email 564. The first feedback email 564 may be displayed in response to a selection of an email item corresponding to the first feedback email 564. The first feedback email 564 may comprise a feedback list 571 comprising indications of one or more sets of feedback in one or more review responses of the first set of review responses (received by the email review system 532 from the one or more first reviewers, for example). For example, the feedback list 571 may comprise feedback from each reviewer, of the one or more first reviewers, that submitted feedback associated with the proposed email content 548. For example, the first feedback email 564 may comprise an indication of a first set of feedback 570 in the first review response from the first reviewer email account 540 (e.g., the first set of feedback 570 may be feedback submitted by the first reviewer via the first email review interface 560 of the first review request email 544). The first set of feedback 570 may be displayed in a text box (e.g., a non-editable text box). Alternatively and/or additionally, the first feedback email 564 may comprise an indication of the first reviewer associated with the first set of feedback 570 (e.g., a name "Andy J" of the first reviewer) and/or an indication of an email address (e.g., "andyjones@example.com") of the first reviewer. Alternatively and/or additionally, the first feedback email 564 may comprise an indication of a second set of feedback 572 in the second review response from the second reviewer email account. The second set of feedback 572 may be displayed in a text box (e.g., a non-editable text box). Alternatively and/or additionally, the first feedback email 564 may comprise an indication of the second reviewer associated with the second set of feedback 572 (e.g., a name "Sam B" of the second reviewer) and/or an indication of an email address (e.g., "sambrown@ example.com") of the second reviewer. In some examples, the first feedback email 564 may comprise instructions 569 instructing the first user to edit the proposed email content 548 based upon feedback in the feedback list 571.

In some examples, the first feedback email 564 may comprise an approval list (not shown) indicative of one or more reviewers, of the one or more first reviewers, that have provided an indication of approval via a review response of the first set of review responses.

In some examples, the first feedback email 564 may comprise a reviewer status list (not shown) indicative of one or more statuses of one or more reviewers of the one or more first reviewers. A status in the reviewer status list may indicate whether a review response has been received from a reviewer of the one or more first reviewers. For example, the first user may determine, using the reviewer status list, which reviewer provided a review response associated with the proposed email content 548 and which reviewer has not yet provided a review response associated with the proposed email content 548. In some examples, the first feedback email 564 may comprise a reminder selectable input (not shown) associated with transmitting a reminder email to a reviewer that has not yet provided a review response associated with the proposed email content 548. In response to a selection of the reminder selectable input, the email review system 532 may transmit a reminder email (reminding the reviewer to provide a review response for the proposed email content 548, for example) to an email account of the reviewer.

In some examples, the feedback list 571 may comprise dynamic email content (implemented using AMP technology, such as AMP4EMAIL framework, and/or other technology, for example). The email review system 532 may automatically update the feedback list 571 in response to receiving new (and/or revised) feedback from a reviewer of the one or more first reviewers. For example, the first feedback email 564 may be sent to the first email account 566 of the first user before all reviewers of the one or more first reviewers submitted a review response. After transmission of the first feedback email 564, a reviewer of the one or more first reviewers may submit a review response with feedback. The email review system 532 may automatically update the feedback list 571 to include the feedback from the reviewer.

The first feedback email 564 may comprise a first email revision interface 582. The first email revision interface 582 may comprise an email content revision field 574, a submission-for-review selectable input 576 and/or a submission-for-delivery selectable input 580. In some examples, the first email revision interface 582 may comprise dynamic email content (implemented using AMP technology, such as AMP4EMAIL framework, and/or other technology, for example). The first email revision interface 582 may correspond to a dynamic and/or actionable form embedded in the first feedback email 564. The email content revision field 574 may comprise an editable text box. The email content revision field 574 may be pre-populated with a most recent version of the proposed email content 548 (e.g., the same version of the proposed email content 548 that was sent in the first review request email 544).

The first user may edit the proposed email content 548, using the email content revision field 574, to draft a revised version of the proposed email content 548. The first user may edit the proposed email content 548 based upon the first set of feedback 570 and/or the second set of feedback 572 included in the first feedback email 564. In an example, the first user may (i) remove a sentence "This is not acceptable." from the proposed email content 548 based upon the first set of feedback 570 submitted by the first reviewer, and/or (ii) change the term "Wednesday" to "Tuesday" based upon the second set of feedback 572 submitted by the second reviewer.

In some examples, the email review system 532 may receive the revised version of the proposed email content 548. The revised version of the proposed email content 548 may be received in response to a selection of the submission-for-review selectable input 576 or a selection of the submission-for-delivery selectable input 580.

Including the dynamic email content (comprising the first email revision interface 582) in the first feedback email 564 may enable the first user to edit the proposed email content 548 and/or submit the revised version of the proposed email content 548 (via the email content revision field 574, the submission-for-review selectable input 576 and/or the submission-for-delivery selectable input 580) without having to interact with an interface outside the first feedback email 564. For example, the first user may submit the revised version of the proposed email content 548 by interacting with the dynamic email content (e.g., the first email revision interface 582) within the first feedback email 564. For example, the first user may submit the revised version of the proposed email content 548 without interacting with a reply-to interface 578 and/or a compose email interface (that would be displayed in response to selecting a compose selectable input 581, for example) of the first email interface. For example, the first email revision interface 582 may be separate from and/or outside of the reply-to interface 578 and/or the compose email interface. The revised version of the proposed email content 548 may not be transmitted via an email (e.g., the revised version of the proposed email content 548 is not submitted by sending an email). For example, the first email account 566 may not send an email when the first user submits the revised version of the proposed email content 548 to the email review system 532.

In some examples, the email review system 532 may transmit a feedback email (e.g., the first feedback email 564) comprising an email revision interface (e.g., the first email revision interface 582) in response to a (single) review response comprising feedback from a reviewer of the one or more first reviewers. For example, the email review system 532 may not wait until a current review cycle is complete (and/or the email review system 532 may not wait until all reviewers of the one or more first reviewers provide a review response in the current review cycle and/or until the second threshold duration of time elapses) to send the feedback email. In this way, the first user may be allowed to submit revisions to the proposed email content 548 in response to each review response comprising feedback (rather than having to wait until the current review cycle is complete to submit a revision).

In some examples, the email review system 532 may automatically determine one or more revisions to the proposed email content 548 based upon the one or more sets of feedback in the first set of review responses, and/or may suggest the one or more revisions via the first email revision interface 582. For example, the email view system 532 may analyze the one or more sets of feedback and the proposed email content 548 to determine the one or more revisions. In some examples, the one or more revisions may be determined using a machine learning model. The machine learning model may, for example, comprise at least one of a neural network, a tree-based model, a machine learning model used to perform linear regression, a machine learning model used to perform logistic regression, a decision tree model, a support vector machine (SVM), a Bayesian network model, a k-Nearest Neighbors (k-NN) model, a K-Means model, a random forest model, a machine learning model used to perform dimensional reduction, a machine learning model used to perform gradient boosting, etc.

In an example, based upon the first set of feedback 570 submitted by the first reviewer comprising "I think you can remove the 'This is not acceptable' sentence", the email review system 532 may determine a first revision to the proposed email content 548 comprising removing a sentence, in the proposed email content 548, comprising "This is not acceptable.". Alternatively and/or additionally, based upon the second set of feedback 572 comprising "Change Wednesday to Tuesday", the email review system 532 may determine a second revision to the proposed email content 548 comprising changing a term from "Wednesday" to "Tuesday".

The email review system 532 may control the first email revision interface 582 based upon the one or more revisions (e.g., the first revision and/or the second revision). For example, the email review system 532 may display a representation of an automatically revised version of the proposed email content 548 according to the one or more revisions. Alternatively and/or additionally, the email review system 532 may display one or more accept and/or reject selectable inputs for accepting or rejecting the one or more revisions.

Figure 5H:
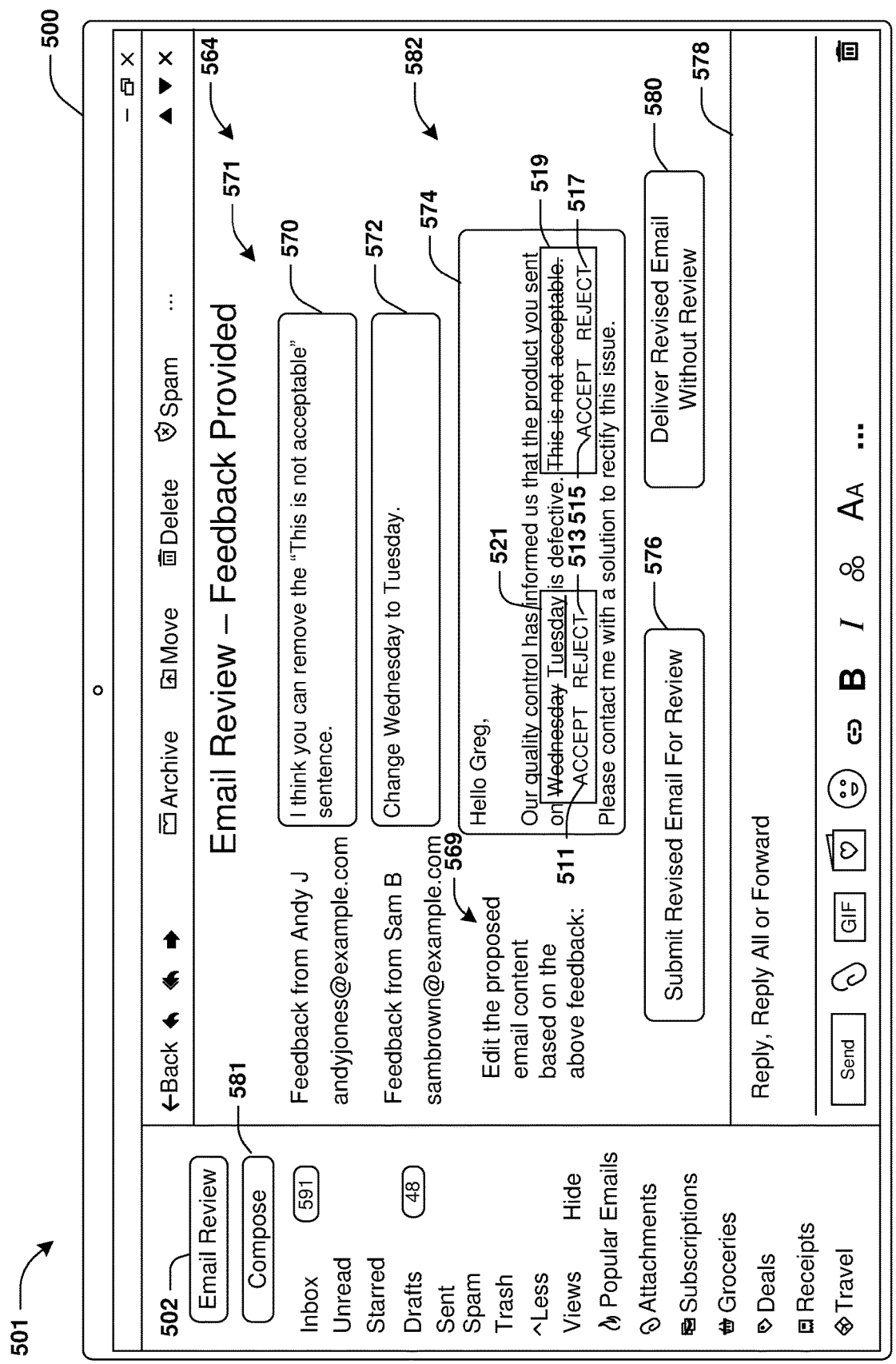
FIG. 5H is a component block diagram illustrating an example system for facilitating email review, where an email revision interface displays a first automatic revision box associated with a first revision and/or a second automatic revision box associated with a second revision.

FIG. 5H illustrates an example in which the first email revision interface 582 displays a first automatic revision box 519 associated with the first revision and/or a second automatic revision box 521 associated with the second revision. The first email revision interface 582 may display, in the first automatic revision box 519, an indication (e.g., a strike-through) of removing the sentence "This is not acceptable." according to the first revision, a first accept selectable input 515 to accept the first revision and/or a first reject selectable input 517 to reject the first revision. In response to a selection of the first accept selectable input 515, the first revision may be implemented (e.g., the sentence "This is not acceptable." may be removed). In response to a selection of the first reject selectable input 517, the first revision may be cancelled (e.g., the strike-through through the sentence "This is not acceptable." may be removed).

The first email revision interface 582 may display, in the second automatic revision box 521, an indication (e.g., a strike-through) of removing the term "Wednesday" according to the second revision, an indication (e.g., underlined text) of adding the term "Tuesday" according to the second revision, a second accept selectable input 511 to accept the second revision and/or a second reject selectable input 513 to reject the second revision. In response to a selection of the second accept selectable input 511, the second revision may be implemented (e.g., the term "Wednesday" may be changed to "Tuesday"). In response to a selection of the second reject selectable input 513, the second revision may be cancelled (e.g., the strike-through through the term "Wednesday" may be removed and/or the term "Tuesday" may be removed).

In some examples, the email review system 532 may provide a training module with machine learning model feedback. The machine learning model feedback may comprise (i) the revised version of the proposed email content 548 (received in response to a selection of the submission-for-review selectable input 576 or the submission-for-delivery selectable input 580, for example) and/or (ii) one or more user interactions with the first email revision interface 582 (e.g., whether the first user accepted or rejected a revision, such as the first revision and/or the second revision, proposed by the email review system 532). The training module may use the machine learning model feedback to train (e.g., further train) the machine learning model to update trainable parameters and/or improve an accuracy of the machine learning model. In this way, the email review system 532 implements a closed-loop process allowing usage of feedback to tailor and/or continuously and/or periodically update the machine learning model used to suggest revisions to users, thereby improving (e.g., continuously and/or periodically improving over time) a quality and/or accuracy of automatic email revision. It may be appreciated that the machine learning model may be used to suggest revisions that are tailored for a particular email being drafted in view of the drafter, the reviewer(s), the recipient(s) and/or a topic of the particular email, such that first revisions may be suggested for first text when the first text is intended to be sent to a potential employer, but second revisions may be suggested for the first text (or similar text) when the first text (or the similar text) is intended to be sent to a potential social connection, for example. Closed-loop control may reduce errors and produce more efficient operation of a computer system which implements the machine learning model and/or determines and/or suggests revisions. The reduction of errors and/or the efficient operation of the computer system may improve operational stability and/or predictability of operation. Accordingly, using processing circuitry to implement closed loop control described herein may improve operation of underlying hardware of the computer system.

Figure 5I:
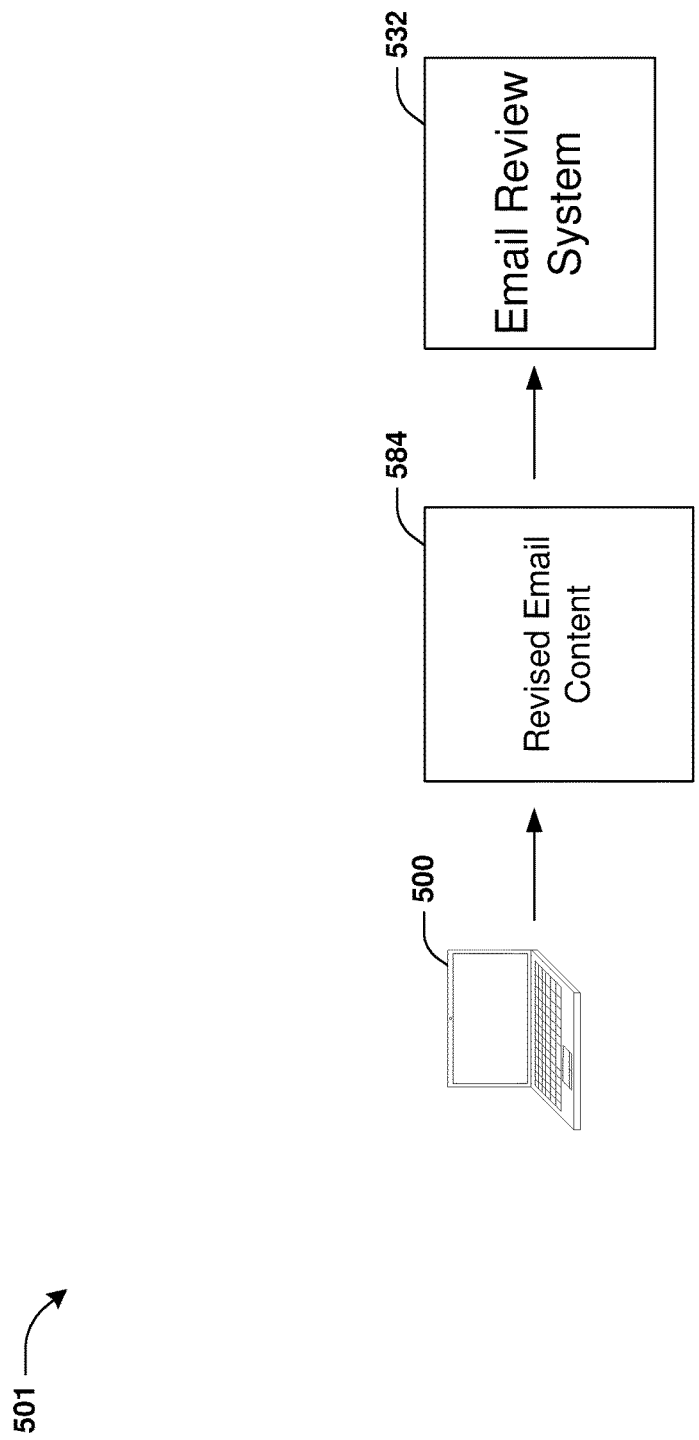
FIG. 5I is a component block diagram illustrating an example system for facilitating email review, where a first client device transmits revised email content to an email review system.

FIG. 5I illustrates the first client device 500 transmitting revised email content 584 (comprising the revised version of the proposed email content 548 submitted via the email content revision field 574) to the email review system 532 (in response to a selection of the submission-for-review selectable input 576 or a selection of the submission-for-delivery selectable input 580). The email review system 532 may update the email review process record in response to receiving the revised email content 584. For example, the email review system 532 may store an indication of the revised email content 584 in the email review process record.

In some examples, the submission-for-review selectable input 576 may be associated with sending the revised email content 584 (e.g., the revised version of the proposed email content 548) for review by the one or more first reviewers in the second review cycle of the email review process. For example, in response to a selection of the submission-for-review selectable input 576, a second set of review request emails comprising the revised email content 584 may be generated and/or transmitted to the one or more reviewer email accounts of the one or more first reviewers.

Figure 5J:
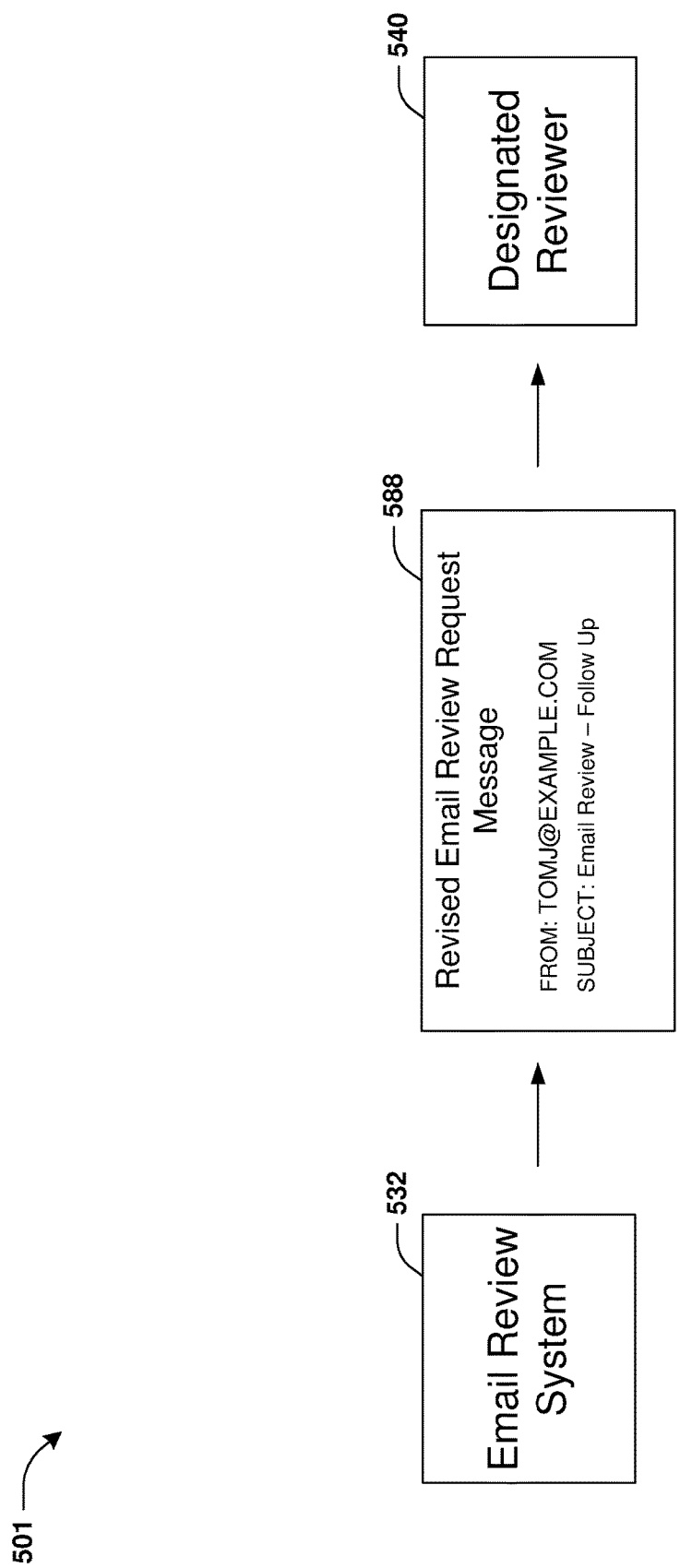
FIG. 5J is a component block diagram illustrating an example system for facilitating email review, where an email review system transmits a third review request email, of a second set of review request emails, to a first reviewer email account.

FIG. 5J illustrates the email review system 532 transmitting a third review request email 588, of the second set of review request emails, to the first reviewer email account 540 of the first reviewer. The third review request email 588 may be generated and/or transmitted (with dynamic email content, for example) using one or more of the techniques provided herein with respect to generating and/or transmitting the first review request email 544. The third review request email 588 may indicate that the third review request email 588 is sent by the first email account 566. For example, the email review system 532 may populate a "from" field (and/or a "sender" field) in an email header of the third review request email 588 with an indication of the email address (e.g., "TOMJ@EXAMPLE.COM") of the first email account 566. Alternatively and/or additionally, the third review request email 588 may comprise one, some and/or all of the features provided herein with respect to the first email review interface 560 and/or the first review request email 544. In some examples, the third review request email 588 may comprise the revised email content 584, a second feedback entry field (e.g., the feedback entry field 552) associated with submitting feedback associated with the revised email content 584, a second approval selectable input (e.g., the approval selectable input 556) and/or a second suggest feedback selectable input (e.g., the suggest feedback selectable input 554). In some examples, the first reviewer may provide feedback to the revised email content 584 using the second feedback entry field and/or the second suggest feedback selectable input. Alternatively and/or additionally, the first reviewer may indicate approval of the revised email content 584 via a selection of the second approval selectable input. The third review request email 588 may comprise an indication of the current review cycle (e.g., the third review request email 588 may comprise an indication that the current review cycle is the second review cycle: "This is the second round of reviews for this email"). Alternatively and/or additionally, the third review request email 588 may comprise representations of one or more previously submitted versions of the proposed email content 548 (submitted by the first user), one or more representations of previously submitted feedback (e.g., one or more sets of feedback received in the initial review cycle), and/or one or more indications of one or more reviewers that (already) approved a previous and/or current version of the proposed email content 548.

In some examples, the third review request email 588 is a dynamic email comprising dynamic email content based upon the first reviewer email account being associated with the dynamic email function. Alternatively and/or additionally, the second set of review request emails may comprise a fourth review request email (not shown) sent to the second reviewer email account, wherein the fourth review request email may be a static email based upon a determination that the second reviewer email account is not associated with the dynamic email function.

The second set of review request emails may be used to collect a second set of review responses (from the one or more first reviewers, for example) in the second review cycle of the email review process. For example, the second set of (one or more) review responses (associated with the revised email content 584) may be received from the one or more reviewer email accounts in response to the second set of review request emails (e.g., the one or more first reviewers may use the second set of review request emails to submit the second set of review responses). The email review system 532 may determine that the second review cycle of the email review process is complete based upon a determination that the review cycle completion condition is met (e.g., the email review system 532 may determine whether the second review cycle of the email review process is complete using one or more of the techniques provided herein with respect to determining whether the initial review cycle is complete).

In response to determining that (i) the second review cycle is complete, (ii) the approval condition is met, and/or (iii) the review process status indicates that approval of the most recent version of the proposed email content 548 (e.g., the revised email content 584) is granted, the email review system 532 may perform the one or more approved-email actions. Whether or not the approval condition is met may be determined based upon the second set of review responses using one or more of the techniques provided herein with respect to determining whether or not the approval condition is met based upon the first set of review responses.

In response to determining that (i) the second review cycle is complete, (ii) the approval condition is not met, (iii) a review response of the second set of review responses comprises feedback associated with the revised email content 584, and/or (iv) the review process status indicates that feedback associated with the revised email content 584 is available, the email review system 532 may perform the one or more available-feedback actions in a next (e.g., third) review cycle of the email review process. In some examples, review cycles of the email review process may reoccur until occurrence of an event comprising (i) the approval condition being met (e.g., a most recent version of the proposed email content 548 being approved by the one or more first reviewers), and/or (ii) the email review system 532 receiving a selection of the submission-for-delivery selectable input 580 (shown in FIGS. 5G-5H and discussed below). The email review system 532 may perform the one or more approved-email actions in response to the event.

In some examples, the submission-for-delivery selectable input 580 (shown in FIGS. 5G-5H) may be associated with sending an email comprising the revised email content 584 (e.g., the revised version of the proposed email content 548) to the one or more intended recipients. For example, in response to a selection of the submission-for-delivery selectable input 580, a content-delivery email comprising the revised email content 584 may be generated and/or transmitted to the one or more intended recipients. In this way, the email review process may be completed (e.g., prematurely completed without final approval of all of the one or more first reviewers and/or by skipping a review cycle in which the one or more first reviewers would review and/or approve the revised email content 584) in response to a selection of the submission-for-delivery selectable input 580. Alternatively and/or additionally, in response to a selection of the submission-for-delivery selectable input 580, the email review system 532 may update the email review process record by (i) storing an indication, in the email review process record, that the email review process is complete, and/or (ii) storing an indication, in the email review process record, that the revised email content 584 is a final version of the proposed email content 548 (to be sent to the one or more intended recipients, for example).

Figure 5K:
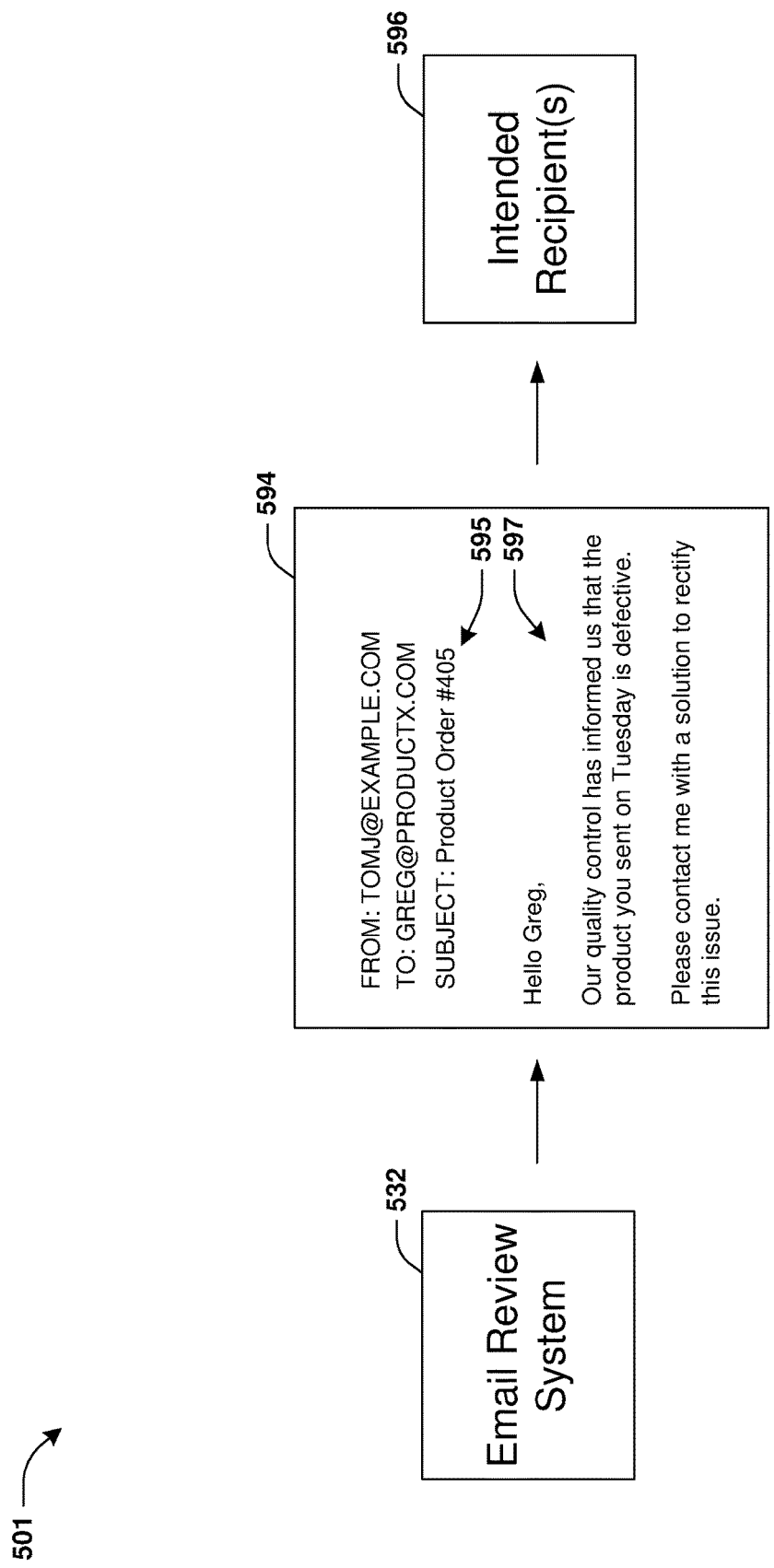
FIG. 5K is a component block diagram illustrating an example system for facilitating email review, where an email review system transmits a content-delivery email to one or more intended recipients.

FIG. 5K illustrates the email review system 532 transmitting the content-delivery email (shown with reference number 594) to the one or more intended recipients (shown with reference number 596). In an example, the content-delivery email 594 be generated based upon the most recent version, of the proposed email content 548, stored in the email review process record. Alternatively and/or additionally, the content-delivery email 594 may be generated based upon the review initiation request 530. For example, the email review system 532 may generate the content-delivery email 594 to have the email subject (e.g., "Product Order #405") indicated by the review initiation request 530. Alternatively and/or additionally, the email review system 532 may determine the one or more intended recipients 596 based upon the review initiation request 530 (e.g., the email review system 532 may generate the review initiation request 530 to be addressed to "greg@productx.com" based upon the review initiation request 530 indicating "greg@productx.com" as an intended recipient). Accordingly, in response to a selection of the submission-for-delivery selectable input 580, the email review system 532 may transmit the content-delivery email 594 to the one or more intended recipients 596 (e.g., "greg@productx.com") automatically and/or without manual user intervention. The content-delivery email 594 may indicate that the content-delivery email 594 is sent by the first email account 566. For example, the email review system 532 may populate a "from" field (and/or a "sender" field) in an email header 595 of the content-delivery email 594 with an indication of the email address (e.g., "TOMJ@EXAMPLE.COM") of the first email account 566. The email header 595 may comprise a "to" field indicative of one or more email addresses of the one or more intended recipients 596 (e.g., the "to" field may be populated with "greg@productx.com" corresponding to an email address of an intended recipient). The email header 595 may comprise a "subject" field indicative of the email subject (e.g., "Product Order #405") indicated by the review initiation request 530. The content-delivery email 594 may comprise an email body 597 comprising the most recent version, of the proposed email content 548, stored in the email review process record.

In some examples, in response to transmitting the content-delivery email 594 to the one or more intended recipients 596 (and/or in response to receiving the selection of the submission-for-delivery selectable input 580), the email review system 532 may transmit a confirmation email to the first email account 566 (and/or to the one or more reviewer email accounts). In an example, the confirmation email may (i) indicate a time of the transmission, (ii) inform the first user (and/or the one or more first reviewers) that the content-delivery email 594 was transmitted, and/or (iii) provide a representation (e.g., a copy) of the content-delivery email 594 transmitted to the one or more intended recipients 596.

In some examples, the one or more approved-email actions may comprise transmitting an approved content email, comprising an approved version of the proposed email content 548 (e.g., the most recent version of the proposed email content 548 when the approval condition is determined to be met), to the one or more intended recipients 596 (such as using one or more of the techniques provided herein with respect to generating and/or transmitting the content-delivery email 594). In some examples, in response to determining that the approval condition is met, the email review system 532 may transmit the approved content email to the one or more intended recipients 596 automatically and/or without manual user intervention. For example, the email review system 532 may transmit the approved content email to the one or more intended recipients 596 automatically and/or without manual user intervention (in response to determining that the approval condition is met) based upon the automatic delivery-upon-approval function being enabled for the email review process. For example, the email review system 532 may transmit the approved content email to the one or more intended recipients 596 automatically and/or without manual user intervention (in response to determining that the approval condition is met) based upon the review initiation request 530 indicating enablement of the automatic delivery-upon-approval function. Alternatively and/or additionally, the one or more approved-email actions may comprise transmitting a confirmation email to the first email account 566 (and/or to the one or more reviewer email accounts). In an example, the confirmation email may be transmitted after transmission of the approved content email to the one or more intended recipients 596, and the confirmation email may (i) indicate a time of the transmission, (ii) inform the first user (and/or the one or more first reviewers) that the approved content email was transmitted, and/or (iii) provide a representation (e.g., a copy) of the approved content email (comprising the approved version of the proposed email content 548) transmitted to the one or more intended recipients 596. Alternatively and/or additionally, the confirmation email may be transmitted before transmission of the approved content email to the one or more intended recipients 596, and the confirmation email may (i) indicate a time at which the approved content email is scheduled to be transmitted to the one or more intended recipients 596, (ii) provide a representation (e.g., a copy) of the approved content email (comprising the approved version of the proposed email content 548) to be transmitted to the one or more intended recipients 596, (iii) comprise a cancel selectable input (e.g., a cancel transmission button) associated with cancelling the scheduled transmission of the approved content email (e.g., the email review system 548 may cancel the scheduled transmission in response to a selection of the cancel selectable input), and/or (iv) a revise selectable input associated with revising the approved version of the proposed email content 548 (e.g., an email revision interface, with which the first user may submit revisions to the approved version of the proposed email content 548, may be displayed in response to a selection of the revise selectable input).

Figure 5L:
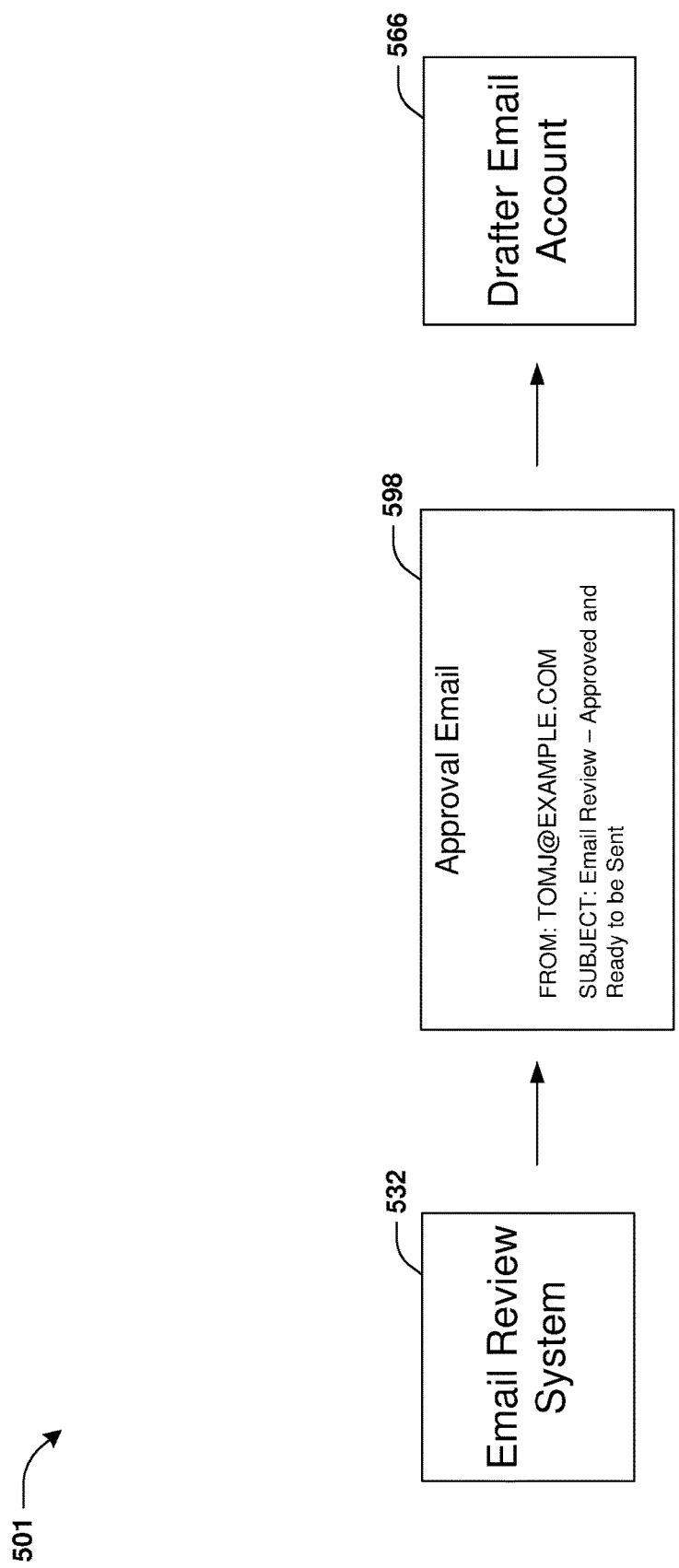
FIG. 5L is a component block diagram illustrating an example system for facilitating email review, where an email review system transmits an approval email to a first email account.

In some examples, the approved content email (comprising the approved version of the proposed email content 548) may not automatically be transmitted to the one or more intended recipients 596. For example, the email review system 532 may not automatically transmit the approved content email to the one or more intended recipients 596 (in response to determining that the approval condition is met) based upon the automatic delivery-upon-approval function being disabled for the email review process (e.g., the review initiation request 530 may indicate disablement of the automatic delivery-upon-approval function). In some examples, the one or more approved-email actions may comprise transmitting an approval email to the first email account 566. For example, the email review system 532 may transmit the approval email to the first email account 566 (in response to the determining that the approval condition is met) based upon the automatic delivery-upon-approval function being disabled for the email review process. FIG. 5L illustrates the email review system 532 transmitting the approval email (shown with reference number 598) to the first email account 566. In some examples, the first user (associated with the first email account 566) may access the approval email 598 via the first email interface on the first client device 500. The approval email 598 may indicate that the approval email 598 is sent by the first email account 566. For example, the email review system 532 may populate a "from" field (and/or a "sender" field) in an email header of the approval email 598 with an indication of the email address (e.g., "TOMJ@EXAMPLE.COM") of the first email account 566.

Figure 5M:
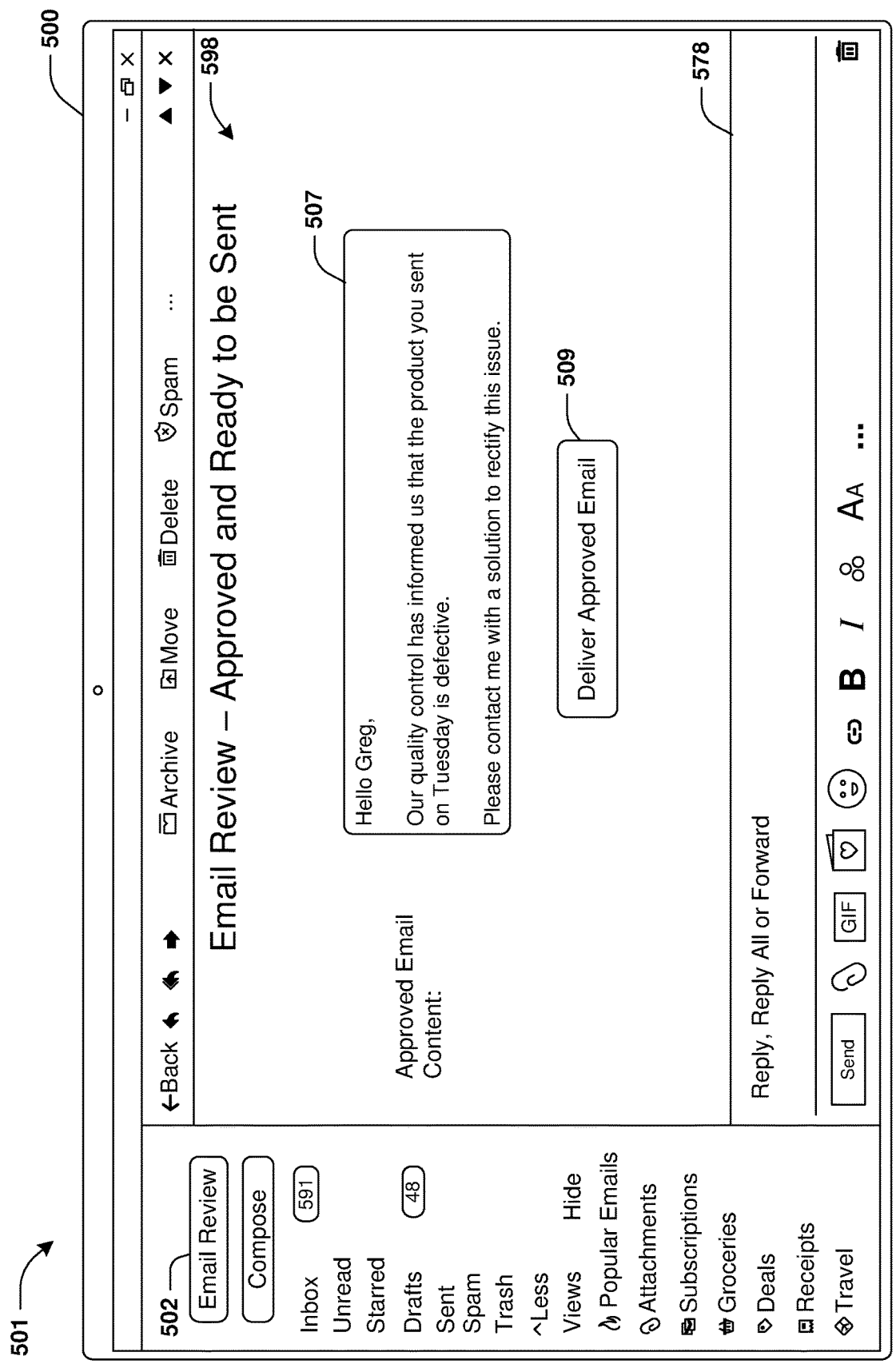
FIG. 5M is a component block diagram illustrating an example system for facilitating email review, where a first email interface displays an approval email.

FIG. 5M illustrates the first email interface displaying the approval email 598. The approval email 598 may be displayed in response to a selection of an email item corresponding to the approval email 598. The approval email 598 may comprise a representation 507 of the approved version of the proposed email content 548. Alternatively and/or additionally, the approval email 598 may comprise an email delivery selectable input 509 associated with transmitting the approved content email to the one or more intended recipients 596. In some examples, the email review system 532 may transmit the approved content email to the one or more intended recipients 596 in response to a selection of the email delivery selectable input 509.

In some examples, the email review system 532 may provide an email review process modification interface for changing one or more settings (e.g., the automatic delivery-upon-approval function, the one or more intended recipients, the email subject, etc.) associated with the email review process. For example, the email review process modification interface may be accessed (by the first email account 566, for example) via the first email interface. Alternatively and/or additionally, the email review process modification interface may be provided in a feedback email (e.g., the first feedback email 564) sent to the first email account 566. The email review process modification interface may comprise (i) a selectable input for disabling or enabling the automatic delivery-upon-approval function, (ii) an intended recipient entry field for removing or adding an intended recipient, and/or (iii) a subject entry field for submitting a revised email subject. In some examples, the email review process modification interface may comprise a cancel selectable input associated with canceling the email review process.

In some examples, the email review system 532 may enable the first user to perform mid-review cycle editing of the proposed email content 548. In an example, a mid-review cycle editing function may be triggered in response to receiving an editing request from the first email account 566. The editing request may be received in response to a selection of a selectable input in a feedback email (e.g., the first feedback email 564) sent to the first email account 566. Alternatively and/or additionally, the editing request may be received in response to a selection of a selectable input in the email review process modification interface. Triggering the mid-review cycle editing function may trigger the early completion of a current review cycle. For example, in response to triggering the mid-review cycle editing function (e.g., in response to receiving the editing request), the email review system 532 may increment the review cycle identifier (even if a quantity of the one or more review responses received in the current review cycle does not match the quantity of reviewers of the one or more first reviewers). Alternatively and/or additionally, in response to triggering the mid-review cycle editing function (e.g., in response to receiving the editing request), the email review system 532 may transmit an email, comprising an email revision interface (e.g., the first email revision interface 582), to the first email account 566 to enable the first user to edit the proposed email content 548. The email may be generated based upon one or more review responses received in the completed review cycle. For example, the email may comprise a feedback list, an approval list and/or a reviewer status list generated based upon the one or more review responses. The email may enable the first user to submit a revised version of the proposed email content 548, which may then be sent to the one or more first reviewers (e.g., via a set of review request emails) for review in a new review cycle.

Alternatively and/or additionally, in response to triggering the mid-review cycle editing function, an email revision interface may be displayed (for the first user, for example). In some examples, the first user may submit a revised version of the proposed email content 548 via the email revision interface. In some examples, in response to receiving the revised version of the proposed email content 548, the email review system 532 may (i) store the revised version of the proposed email content 548 in the email review process record and/or (ii) automatically update review request emails (previously) sent to the one or more first reviewers based upon the revised version of the proposed email content 548. For example, the representation of the proposed email content 548 shown in the first review request email 544 (e.g., shown in FIG. 5E) may be displayed via dynamic email content of the first review request email 544, and the email review system 532 may automatically update the representation to display the revised version of the proposed email content 548. For example, the email review system 532 may automatically update (using AMP technology, such as AMP4EMAIL framework, and/or other technology, for example) the first review request email 544 to show a most recent version of the proposed email content 548 stored in the email review process record.

Figure 6:
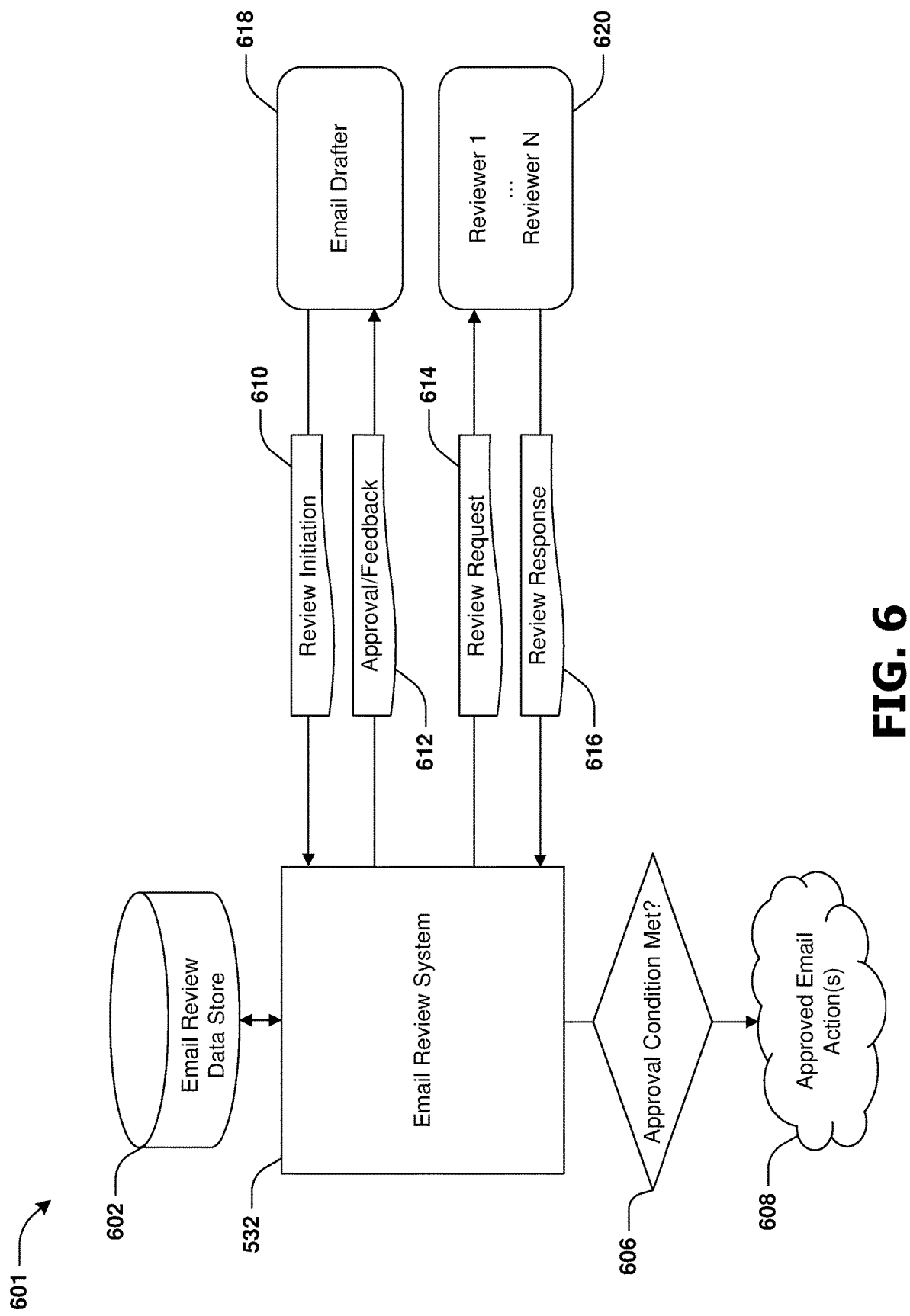
FIG. 6 is a component block diagram illustrating an example system for facilitating email review.

FIG. 6 illustrates an exemplary system 601 for facilitating email review. The email review system 532 may communicate with an email drafter 618 (e.g., the first email account 566) and/or one or more reviewers 620 (e.g., reviewers 1-N) to facilitate an email review process. The email review system 532 may receive, from the email drafter 618, a review initiation request 610 (e.g., the review initiation request 530). In response to the review initiation request 610, the email review system 532 may initiate the email review process in which the one or more reviewers 620 (designated by the email drafter 618 in the review initiation request 610, for example) review proposed email content (provided by the email drafter 618 in the review initiation request 610, for example). The email review system 532 may store a review record (e.g., the email review process record) comprising the proposed email content in the email review data store (shown with reference number 602).

In response to the review initiation request 610, the email review system 532 may transmit one or more review request emails 614 (e.g., the first set of review request emails) to the one or more reviewers 610. In response to receiving one or more review responses 616 (e.g., the first set of review responses) from the one or more reviewers 610 (e.g., the one or more reviewers 610 may submit the one or more review responses 616 using the one or more review request emails 614), the email review system 532 may (i) update the review record (stored in the email review data store 602) based upon the one or more review responses 616, and/or (ii) transmit an email 612 indicative of feedback and/or approval (e.g., the first feedback email 564 and/or the approval email 698) to the email drafter 618 based upon the one or more review responses 616.

In some examples, in response to the approval condition being met at 606 (e.g., in response to a set of review responses received in a review cycle indicating unanimous approval of a revised or original version of the proposed email content), the email review system 532 may perform the one or more approved-email actions (shown with reference number 608). The one or more approved-email actions may comprise transmitting an email, with an approved (e.g., most recent) version of the proposed email content, to one or more intended recipients indicated by the review initiation request 610. In some examples, the email may be transmitted automatically and/or without manual user intervention if the automatic delivery-upon-approval function is enabled for the email review process. Alternatively and/or additionally, if the automatic delivery-upon-approval function is disabled, the email may be transmitted in response to a selection of an email delivery selectable input 509 by the email drafter 618 (e.g., the email delivery selectable input 509 may be selected via an approval email sent to the email drafter 618 in response to the approval condition being met). Whether the automatic delivery-upon-approval function is enabled or disabled may be determined based upon the review initiation request 610.

It may be appreciated that the disclosed subject matter may assist users (and/or devices associated with the users) in engaging in an email review process.

Implementation of at least some of the disclosed subject matter may lead to benefits including, but not limited to, a reduction in screen space and/or an improved usability of a display (e.g., of a device) (e.g., as a result of automatically enabling a reviewer to use a review request email to (i) view proposed email content and/or (ii) provide feedback and/or approval for the proposed email content without manually needing to open different pages and/or windows).

Alternatively and/or additionally, implementation of at least some of the disclosed subject matter may lead to benefits including, but not limited to, a reduction in screen space and/or an improved usability of a display (e.g., of a device) (e.g., as a result of automatically enabling an email drafter to use a feedback email to (i) view a feedback list with feedback received from different reviewers in a review cycle and/or (ii) submit a revised version of proposed email content based upon the feedback, wherein the email drafter does not need to open different emails and/or pages to view different sets of feedback received in the review cycle and/or to submit the revised version of the proposed email content).

In some examples, in response to a selection of a feedback email item (e.g., an email item displayed in a list of email items displayed via the first email interface), a summary of a feedback list (e.g., the feedback list 571) included in a feedback email (e.g., the first feedback email 564) corresponding to the feedback email item may be displayed. In an example, a graphical object, comprising the summary, may be displayed via the first client device 500 in response to the selection of the feedback email item. In some examples, the graphical object may make up merely a portion of the first email interface and/or merely a portion of a display of the first client device 500. Alternatively and/or additionally, while the graphical object is displayed, in response to a selection (e.g., a click and/or a finger touch) of an area outside the graphical object (e.g., an area, of the first email interface and/or the display, that is offset from the graphical object), the graphical object may be closed and/or no longer displayed (e.g., at least a portion of a graphical user interface displayed prior to the selection of the feedback email item may be made visible by closing and/or no longer displaying the graphical object). In an example, the graphical object may comprise a selectable input associated with accessing the feedback list and/or the feedback email (e.g., in response to a selection of the selectable input, a representation of the feedback list and/or the feedback email, such as an entirety of the feedback list and/or the feedback email, may be displayed via the first email interface, such as where the first client device 500 may be redirected to a page comprising the representation of the feedback list and/or the feedback email). In some examples, the summary may comprise a subset of sets of feedback of a plurality of sets of feedback of the feedback list. Accordingly, the first user may quickly and/or conveniently navigate through summaries of feedback lists via a page comprising one or more lists of feedback email items displayed by the first email interface without redirecting from the page and/or closing the page.

In some examples, the first client device 500 is configured to display a menu listing one or more features (e.g., selectable features) of the email review system 532. The one or more features may comprise at least one of an email review feature, a messaging feature, a social media feed feature, etc. In an example, in response to a selection of the email review feature, the email review feature may provide one or more resources (e.g., data, an interface, etc.) for displaying and/or engaging in email review processes (such as using one or more of the techniques provided herein). In response to a selection of the messaging feature, the messaging feature may provide one or more resources (e.g., data, an interface, etc.) for displaying and/or facilitating messaging conversations (e.g., private messaging conversations and/or public messaging conversations) between users of the email review system 532 (e.g., users of the email review system 532 may send messages to each other using the messaging feature of the email review system 532). In response to a selection of the social media feed feature, the social media feed feature may provide one or more resources (e.g., data, an interface, etc.) for displaying social media posts and/or comments on a social media platform. In some examples, the first client device 500 is configured to display a review platform application summary that can be reached directly from the menu, wherein the review platform application summary displays a limited list of data offered within the one or more features. In some examples, each of the data in the limited list of data is selectable to launch the respective feature (of the one or more features) and enable the selected data to be seen within the respective feature. In some examples, the review platform application summary is displayed while the one or more features are in an un-launched and/or unopened state.

In some examples, at least some of the disclosed subject matter may be implemented on a client device, and in some examples, at least some of the disclosed subject matter may be implemented on a server (e.g., hosting a service accessible via a network, such as the Internet).

Figure 7:
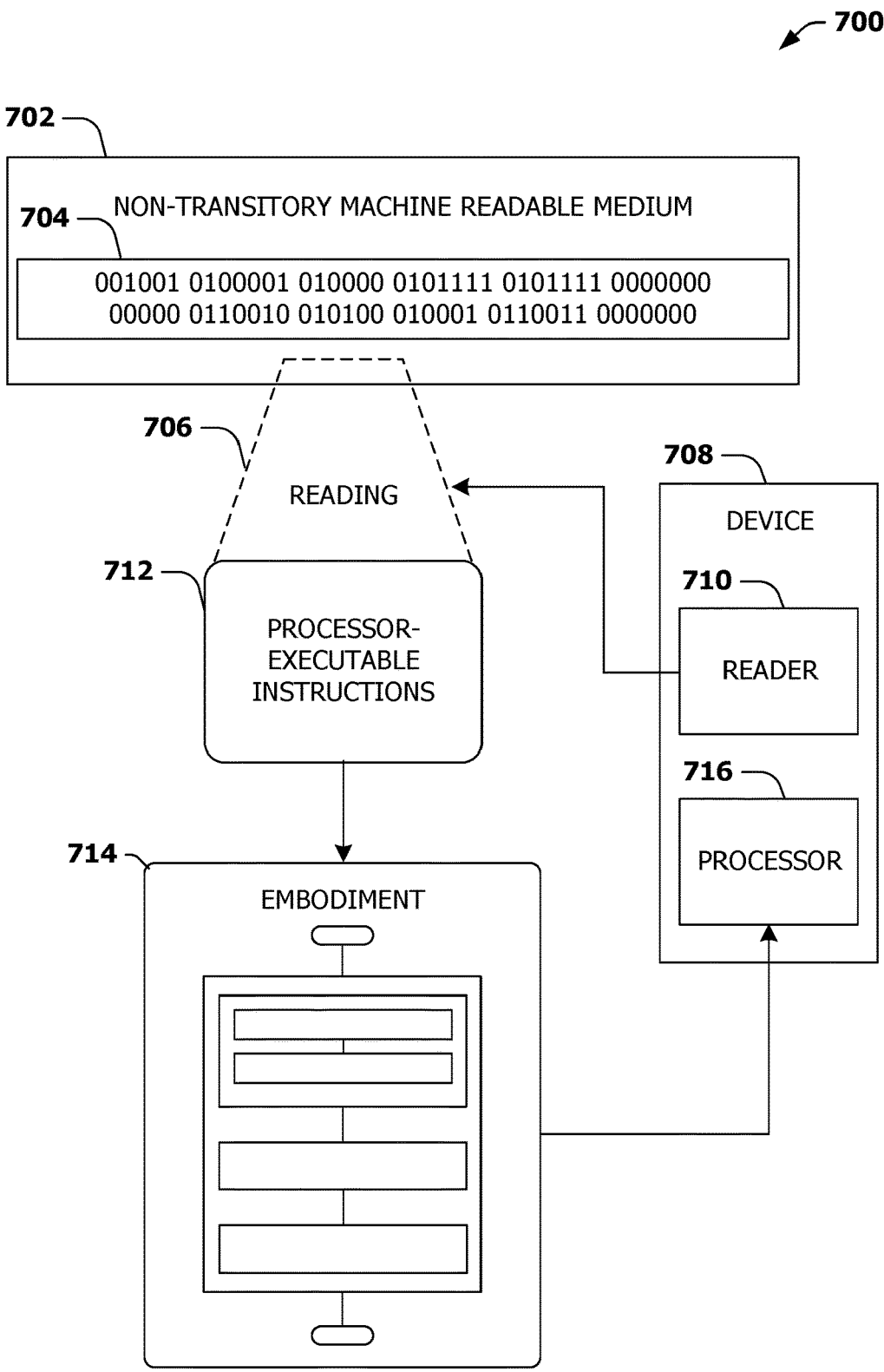
FIG. 7 is an illustration of a scenario featuring an example non-transitory machine readable medium in accordance with one or more of the provisions set forth herein.

FIG. 7 is an illustration of a scenario 700 involving an example non-transitory machine readable medium 702. The non-transitory machine readable medium 702 may comprise processor-executable instructions 712 that when executed by a processor 716 cause performance (e.g., by the processor 716) of at least some of the provisions herein (e.g., embodiment 714). The non-transitory machine readable medium 702 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 702 stores computer-readable data 704 that, when subjected to reading 706 by a reader 710 of a device 708 (e.g., a read head of a hard disk drive, or a read operation invoked on a solid-state storage device), express the processor-executable instructions 712. In some embodiments, the processor-executable instructions 712, when executed, cause performance of operations, such as at least some of the example method 400 of FIG. 4, for example. In some embodiments, the processor-executable instructions 712 are configured to cause implementation of a system, such as at least some of the exemplary system 501 of FIGS. 5A-5M and/or the exemplary system 601 of FIG. 6, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
receiving a review initiation request from a first email account, wherein the review initiation request is indicative of:
proposed email content;
a reviewer of the proposed email content; and
a second reviewer of the proposed email content;
generating, based upon the review initiation request, an email comprising:
the proposed email content; and
an email review interface comprising:
a feedback entry field; and
an approval selectable input;
transmitting the email to a reviewer email account of the reviewer;
transmitting the email to a second reviewer email account of the second reviewer;
receiving, from the reviewer email account and via a first instance of the email review interface, a review response indicating at least one of:
feedback, indicating one or more suggestions associated with the proposed email content, submitted via a first instance of the feedback entry field; or
an approval indicator, indicating approval of the proposed email content, submitted via a first instance of the approval selectable input;

receiving, from the second reviewer email account and via a second instance of the email review interface, a second review response indicating at least one of:
    second feedback, indicating one or more second suggestions associated with the proposed email content, submitted via a second instance of the feedback entry field; or
    a second approval indicator, indicating second approval of the proposed email content, submitted via a second instance of the approval selectable input; and
generating, by an email review system and based upon (i) the review response from the reviewer email account and (ii) the second review response from the second reviewer email account, an email revision interface comprising a first selectable input associated with providing one or more reviewers with a revised version of the proposed email content, a second selectable input associated with providing one or more intended recipients with a second email corresponding to the revised version of the proposed email content and an email content revision field concurrently displaying (i) at least some of the proposed email content within a first field, (ii) a first representation of the one or more suggestions, from the reviewer email account, within the first field comprising at least some of the proposed email content and (iii) a second representation of the one or more second suggestions, from the second reviewer email account, within the first field comprising at least some of the proposed email content.

2. The method of claim 1, wherein:
the email revision interface concurrently displays (i) a third selectable input for at least one of accepting or rejecting the one or more suggestions from the reviewer email account and (ii) a fourth selectable input for at least one of accepting or rejecting the one or more second suggestions from the second reviewer email account.

3. The method of claim 1, comprising:
generating, by the email review system, a third email comprising the email revision interface; and
transmitting, by the email review system, the third email to the first email account,
wherein the third email comprises at least one of:
    an indication of the feedback in the review response; or
    an indication of the approval indicator.

4. The method of claim 3, wherein:
the method comprises:
    receiving, from the first email account and via the email revision interface, a revised version of the proposed email content;
    generating, based upon the revised version of the proposed email content, a fourth email comprising:
        the revised version of the proposed email content; and
        a second email review interface comprising:
            a second feedback entry field; and
            a second approval selectable input; and
    transmitting the fourth email to the reviewer email account.

5. The method of claim 1, wherein:
the review initiation request is indicative of an intended recipient of the proposed email content; and
the method comprises:
    determining, based upon the review response, whether an approval condition associated with the proposed email content is met; and
    in response to determining that the approval condition is met, transmitting a third email, comprising the proposed email content, to the intended recipient.

6. The method of claim 5, wherein:
transmitting the third email to the intended recipient is performed based upon a determination that the review initiation request indicates enablement of an automatic delivery-upon-approval function.

7. The method of claim 5, wherein:
determining that the approval condition is met is based upon a determination that the review response comprises the approval indicator.

8. The method of claim 1, wherein:
the review initiation request is indicative of an intended recipient of the proposed email content; and
the method comprises:
    determining, based upon the review response, whether an approval condition associated with the proposed email content is met;
    in response to determining that the approval condition is met, transmitting a third email to the first email account, wherein the third email comprises:
        the proposed email content;
        an indication that the proposed email content is approved; and
        an email delivery selectable input; and
    in response to receiving a selection of the email delivery selectable input, transmitting a fourth email, comprising the proposed email content, to the intended recipient.

9. The method of claim 8, wherein:
transmitting the third email to the first email account is performed based upon a determination that the review initiation request indicates disablement of an automatic delivery-upon-approval function associated with automatic transmission of the proposed email content to the intended recipient in response to the approval condition being met.

10. The method of claim 1, wherein:
at least some of the first representation of the one or more suggestions from the reviewer email account is displayed between a first portion of the proposed email content and a second portion of the proposed email content.

11. The method of claim 1, wherein:
generating the email comprises including, in the email, dynamic email content comprising the email review interface based upon a determination that the reviewer email account is associated with a dynamic email function.

12. The method of claim 11, wherein:
the review initiation request is indicative of a third reviewer of the proposed email content; and
the method comprises:
    generating, based upon the review initiation request, a static email comprising the proposed email content; and
    transmitting the static email to a third reviewer email account associated with the third reviewer.

13. The method of claim 12, wherein:
the dynamic email content is not included in the static email based upon a determination that the third reviewer email account is not associated with a dynamic email function.

14. A computing device comprising:
a processor; and
memory comprising processor-executable instructions that when executed by the processor cause performance of operations, the operations comprising:
receiving a review initiation request from a first email account, wherein the review initiation request is indicative of:
proposed email content;
a reviewer of the proposed email content; and
a second reviewer of the proposed email content;
generating, based upon the review initiation request, an email comprising:
the proposed email content; and
an email review interface comprising:
a feedback entry field; and
an approval selectable input;
transmitting the email to a reviewer email account of the reviewer;
transmitting the email to a second reviewer email account of the second reviewer;
receiving, from the reviewer email account and via a first instance of the email review interface, a review response indicating at least one of:
feedback, indicating one or more suggestions associated with the proposed email content, submitted via a first instance of the feedback entry field; or
an approval indicator, indicating approval of the proposed email content, submitted via a first instance of the approval selectable input;
receiving, from the second reviewer email account and via a second instance of the email review interface, a second review response indicating at least one of:
second feedback, indicating one or more second suggestions associated with the proposed email content, submitted via a second instance of the feedback entry field; or
a second approval indicator, indicating second approval of the proposed email content, submitted via a second instance of the approval selectable input; and
generating, by an email review system and based upon (i) the review response from the reviewer email account and (ii) the second review response from the second reviewer email account, an email revision interface comprising a first selectable input associated with providing one or more reviewers with a revised version of the proposed email content, a second selectable input associated with providing one or more intended recipients with a second email corresponding to the revised version of the proposed email content and an email content revision field concurrently displaying (i) at least some of the proposed email content within a first field, (ii) a first representation of the one or more suggestions, from the reviewer email account, within the first field comprising at least some of the proposed email content and (iii) a second representation of the one or more second suggestions, from the second reviewer email account, within the first field comprising at least some of the proposed email content.

15. The computing device of claim 14, the operations comprising:
generating a third email comprising the email revision interface; and
transmitting the third email to the first email account.

16. The computing device of claim 15, wherein:
the third email comprises at least one of:
an indication of the feedback in the review response; or
an indication of the approval indicator.

17. The computing device of claim 16, wherein:
the operations comprise:
receiving, from the first email account and via the email revision interface, a revised version of the proposed email content;
generating, based upon the revised version of the proposed email content, a fourth email comprising:
the revised version of the proposed email content; and
a second email review interface comprising:
a second feedback entry field; and
a second approval selectable input; and
transmitting the fourth email to the reviewer email account.

18. The computing device of claim 14, wherein:
the review initiation request is indicative of an intended recipient of the proposed email content; and
the operations comprise:
determining, based upon the review response, whether an approval condition associated with the proposed email content is met; and
in response to determining that the approval condition is met, transmitting a third email, comprising the proposed email content, to the intended recipient.

19. A non-transitory machine readable medium having stored thereon processor-executable instructions that when executed cause performance of operations, the operations comprising:
receiving a review initiation request from a first email account, wherein the review initiation request is indicative of:
proposed email content;
a reviewer of the proposed email content; and
a second reviewer of the proposed email content;
generating, based upon the review initiation request, an email comprising:
the proposed email content; and
an email review interface comprising:
a feedback entry field; and
an approval selectable input;
transmitting the email to a reviewer email account associated with the reviewer;
transmitting the email to a second reviewer email account associated with the second reviewer;
receiving, from the reviewer email account and via a first instance of the email review interface, a review response indicating at least one of:
feedback, indicating one or more suggestions associated with the proposed email content, submitted via a first instance of the feedback entry field; or
an approval indicator, indicating approval of the proposed email content, submitted via a first instance of the approval selectable input;
receiving, from the second reviewer email account and via a second instance of the email review interface, a second review response indicating at least one of:
second feedback, indicating one or more second suggestions associated with the proposed email content, submitted via a second instance of the feedback entry field; or
a second approval indicator, indicating second approval of the proposed email content, submitted via a second instance of the approval selectable input; and generating, by an email review system and based upon (i) the review response from the reviewer email account and (ii) the second review response from the second reviewer email account, an email revision interface comprising a first selectable input associated with providing one or more reviewers with a revised version of the proposed email content, a second selectable input associated with providing one or more intended recipients with a second email corresponding to the revised version of the proposed email content and an email content revision field concurrently displaying (i) at least some of the proposed email content within a first field, (ii) a first representation of the one or more suggestions, from the reviewer email account, within the first field comprising at least some of the proposed email content and (iii) a second representation of the one or more second suggestions, from the second reviewer email account, within the first field comprising at least some of the proposed email content.

20. The non-transitory machine readable medium of claim 19, the operations comprising:

generating a third email comprising the email revision interface; and transmitting the third email to the first email account.

* * * * *